United States Patent
Butler et al.

(10) Patent No.: US 10,927,543 B2
(45) Date of Patent: Feb. 23, 2021

(54) ACOUSTIC ATTENUATION STRUCTURE

(71) Applicant: The Boeing Company, Chicago, IL (US)

(72) Inventors: Geoffrey Allen Butler, Seattle, WA (US); Justin Honshune Lan, Bothell, WA (US)

(73) Assignee: The Boeing Company, Chicago, IL (US)

( * ) Notice: Subject to any disclaimer, the term of this patent is extended or adjusted under 35 U.S.C. 154(b) by 641 days.

(21) Appl. No.: 15/626,173

(22) Filed: Jun. 19, 2017

(65) Prior Publication Data

US 2019/0003177 A1    Jan. 3, 2019

(51) Int. Cl.
| | | |
|---|---|---|
| *E04B 1/00* | (2006.01) | |
| *B32B 3/00* | (2006.01) | |
| *B32B 27/00* | (2006.01) | |
| *F02C 7/00* | (2006.01) | |
| *G10K 11/00* | (2006.01) | |
| *E04B 1/84* | (2006.01) | |
| *B32B 3/12* | (2006.01) | |
| *B32B 27/28* | (2006.01) | |
| *F02C 7/045* | (2006.01) | |

(Continued)

(52) U.S. Cl.
CPC .............. *E04B 1/8409* (2013.01); *B32B 3/12* (2013.01); *B32B 27/28* (2013.01); *F02C 7/045* (2013.01); *G10K 11/168* (2013.01); *G10K 11/172* (2013.01); *B32B 2307/718* (2013.01); *B32B 2307/724* (2013.01)

(58) Field of Classification Search
CPC .... B32B 3/00; B32B 3/10; B32B 3/12; B32B 27/00; B32B 27/20; B32B 27/28; F02C 7/00; F02C 7/04; F02C 7/045; G10K 11/00; G10K 11/10; G10K 11/16; G10K 11/168; G10K 11/17; G10K 11/172; E04B 1/00; E04B 1/80; E04B 1/84; E04B 1/84; E04B 1/8409
See application file for complete search history.

(56) References Cited

U.S. PATENT DOCUMENTS

| | | |
|---|---|---|
| 3,948,346 A | 4/1976 | Schindler |
| 4,300,978 A | 11/1981 | Whitemore et al. |

(Continued)

FOREIGN PATENT DOCUMENTS

JP    H09156010 A    6/1997

OTHER PUBLICATIONS

Great Britain Intellectual Patent Office Combined Search and Examination Report, dated Nov. 19, 2018, regarding Application No. GB1807999.6, 8 pages.

*Primary Examiner* — Jacob T Minskey
*Assistant Examiner* — Matthew Hoover
(74) *Attorney, Agent, or Firm* — Yee & Associates, P.C.

(57) ABSTRACT

An acoustic attenuation structure comprises a gas permeable composite facesheet, a cellular core, and an impermeable backing. The gas permeable composite facesheet has a designated porosity. The designated porosity causes the permeability of the gas permeable composite facesheet. The gas permeable composite facesheet comprises a carbon fiber fabric. The cellular core is bonded to the gas permeable composite facesheet using a resin of the gas permeable composite facesheet without any additional adhesive. The impermeable backing is connected to the cellular core.

25 Claims, 14 Drawing Sheets

(51) Int. Cl.
　　*G10K 11/172*　　(2006.01)
　　*G10K 11/168*　　(2006.01)

(56) References Cited

U.S. PATENT DOCUMENTS

| | | | |
|---|---|---|---|
| 4,379,191 A | | 4/1983 | Beggs et al. |
| 4,700,474 A | * | 10/1987 | Choinski .............. H05K 3/0094 |
| | | | 156/247 |
| 5,543,198 A | * | 8/1996 | Wilson .................. B32B 27/281 |
| | | | 428/116 |
| 6,176,964 B1 | | 1/2001 | Parente et al. |
| 7,682,681 B2 | * | 3/2010 | Allison .................. B32B 5/245 |
| | | | 428/95 |
| 2003/0099810 A1 | * | 5/2003 | Allison .................. B60N 3/048 |
| | | | 428/95 |
| 2009/0025860 A1 | | 1/2009 | Midali et al. |

\* cited by examiner

ACOUSTIC ATTENUATION STRUCTURE

BACKGROUND INFORMATION

1. Field

The present disclosure relates generally to acoustic attenuation structures, and more specifically, to acoustic attenuation structures with composite facesheets. Still more particularly, the present disclosure relates to a method and system for creating composite facesheets without perforations for acoustic attenuation structures.

2. Background

Acoustic attenuation structures reduce sound by at least one of scattering or absorbing sound energy. Conventional acoustic attenuation structures may include a perforated sheet, a core, and an impermeable backing.

Creating a perforated composite sheet involves multiple manufacturing steps that contribute to manufacturing time. Creating perforations in a composite sheet may cut the fibers within the composite sheet. Further, perforated composite sheets may contribute to aerodynamic drag. Therefore, it would be desirable to have a method and apparatus that take into account at east some of the issues discussed above, as well as other possible issues.

SUMMARY

An illustrative embodiment of the present disclosure provides a method. Air flows through a thickness of composite material. The composite material is heated while flowing air through its thickness to form a gas permeable composite facesheet.

Another illustrative embodiment of the present disclosure provides a system. The system comprises a pressure chamber and an uncured composite material. The uncured composite material is positioned within the pressure chamber such that the composite material acts as a rate limiting structure for movement of air between a first pressure within the pressure chamber and a second pressure within the pressure chamber.

A further illustrative embodiment of the present disclosure provides a system. The system comprises a tooling base, a vacuum bag, and a composite material. The vacuum bag is sealed to the tooling base. The composite material is positioned between the tooling base and the vacuum bag. The composite material forms a rate limiting structure for movement of air through the system.

A yet further illustrative embodiment of the present disclosure provides a system. The system comprises a tooling base and a vacuum bag. The tooling base has a first pressure on a tool face of the tooling base. The vacuum bag is sealed to the tooling base. A second pressure is supplied through the vacuum bag. The first pressure and the second pressure are lower than a pressure outside of the vacuum bag.

Another illustrative embodiment of the present disclosure provides an acoustic attenuation structure. The acoustic attenuation structure comprises a gas permeable composite facesheet, a cellular core, and an impermeable backing. The gas permeable composite facesheet has a designated porosity. The designated porosity causes the permeability of the gas permeable composite facesheet. The cellular core is bonded to the gas permeable composite facesheet using a resin of the gas permeable composite facesheet without any additional adhesive. The impermeable backing is connected to the cellular core.

Another illustrative embodiment of the present disclosure provides an acoustic attenuation structure. The acoustic attenuation structure comprises a gas permeable composite facesheet, a first cellular core, a gas permeable composite septum, a second cellular core, and an impermeable backing. The gas permeable composite facesheet has a designated porosity. The designated porosity causes a permeability of the gas permeable composite facesheet. The first cellular core is connected to the gas permeable composite facesheet. The gas permeable composite septum is connected to the first cellular core. The gas permeable composite septum has a designated porosity. The designated porosity causes a permeability of the gas permeable composite septum. The second cellular core is connected to the gas permeable composite septum. The impermeable backing is connected to the second cellular core.

A yet further illustrative embodiment of the present disclosure provides a method. Air flows through a thickness of a composite material and a cellular core in contact with the composite material. The composite material is heated while flowing air through its thickness to form a gas permeable composite facesheet joined to the cellular core.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
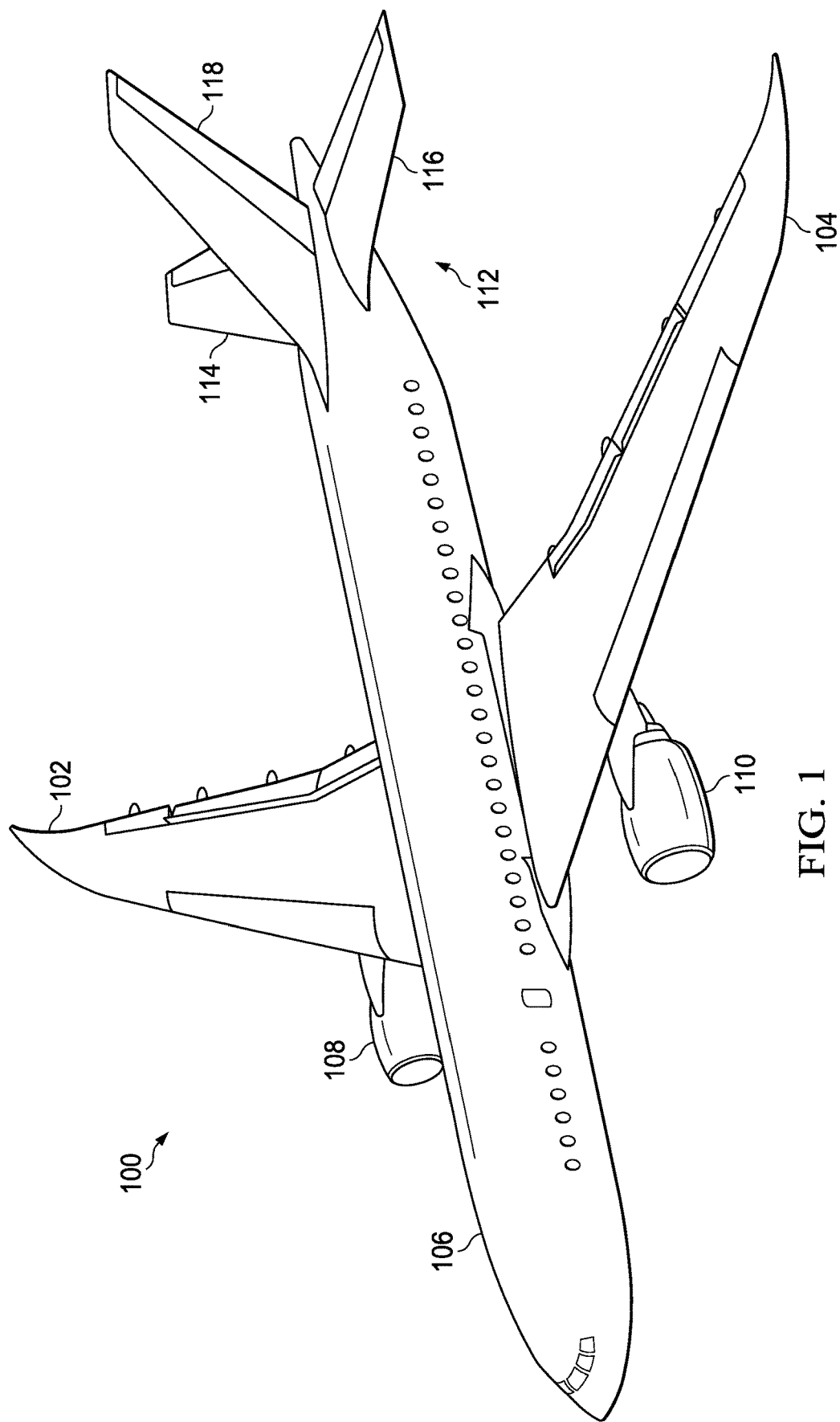
FIG. 1 is an illustration of an aircraft in which an illustrative embodiment may be implemented.

The illustrative embodiments recognize and take into account one or more different considerations. For example, the illustrative embodiments recognize and take into account that the majority of conventional acoustic facing materials for sound attenuation panels use holes, also referred to as perforations, that are created with pin mats, drilled, or sand blasted. The illustrative embodiments recognize and take into account that the processes to manufacture the holes add manufacturing time and cost. The illustrative embodiments further recognize and take into account that hole patterns on the surface of the acoustic panels may create aerodynamic drag. The illustrative embodiments also recognize and take into account that lowering aerodynamic drag would increase overall aircraft efficiency.

The illustrative embodiments recognize and take into account that conventional composite acoustic panels use three full curing stages. The illustrative embodiments recognize and take into account that the conventional composite facesheet is cured and then perforated. The illustrative embodiments recognize and take into account that bonding a cellular core to the perforated composite facesheet is a second curing stage. The illustrative embodiments recognize and take into account that curing the impermeable backing is a third curing stage.

The illustrative embodiments recognize and take into account that reducing a quantity of manufacturing processes reduces the overall manufacturing time. The illustrative embodiments recognize and take into account that reducing a quantity of curing stages would reduce the overall manufacturing time.

The illustrative examples recognize and take into account that material characteristics may be selected for a composite material that allow for good air and volatile extraction during oven curing to minimize porosity in structural laminates. The illustrative examples recognize and take into account that these material characteristics can also be used to design a controlled amount of open porosity into a fabric laminate.

The illustrative embodiments recognize and take into account that it would be desirable to directly control a permeability of a gas permeable composite facesheet. The illustrative embodiments recognize and take into account that gas permeability is a measure of diffusion of a gas through a solid. The illustrative embodiments further recognize and take into account that it would be desirable to provide qualification of at least one of quality or permeability of a gas permeable composite facesheet. The illustrative embodiments further recognize and take into account that it would be most desirable to provide qualification without additional testing or manufacturing time.

The illustrative embodiments recognize and take into account that walls of a cellular core adhered to a conventional gas permeable composite facesheet may block portions of perforations in the conventional gas permeable composite facesheet. The illustrative embodiments recognize and take into account that blocking portions of the perforations in the conventional gas permeable composite facesheet would reduce the permeability of the conventional gas permeable composite facesheet. The illustrative embodiments recognize and take into account that the design of the perforations, such as at least one of the size, the location, or the quantity of the perforations may be selected taking into account the walls of the cellular core. The illustrative embodiments recognize and take into account that the perforations may provide a greater permeability than a desired permeability to compensate for the walls of the cellular core covering portions of the perforations.

The illustrative embodiments further recognize and take into account that gas permeable composite facesheets can be used for additional applications other than acoustic attenuation. For example, the illustrative embodiments recognize and take into account that a gas permeable composite surface may be used as a hybrid laminar flow aerodynamic surface. For example, a user may wish to bleed off a certain amount of the boundary layer or blow air into a main flow to energize a boundary layer using a hybrid laminar flow aerodynamic surface including the gas permeable composite surface.

Referring now to the figures, and in particular, with reference to FIG. 1, an illustration of an aircraft is depicted in which an illustrative embodiment may be implemented. In this illustrative example, aircraft 100 has wing 102 and wing 104 connected to body 106. Aircraft 100 includes engine 108 connected to wing 102 and engine 110 connected to wing 104.

Body 106 has tail section 112. Horizontal stabilizer 114, horizontal stabilizer 116, and vertical stabilizer 118 are connected to tail section 112 of body 106.

Aircraft 100 is an environment in which at least one illustrative embodiment may be implemented. For example, at least one acoustic attenuation structure may be attached to each of engine 108 and engine 110 of aircraft 100. Further, an illustrative embodiment may be utilized during the manufacturing of acoustic attenuation structures for aircraft 100. In some illustrative examples, acoustic attenuation structures are present within body 106 for attenuation of cabin noise.

This illustration of aircraft 100 is provided for purposes of illustrating one environment in which different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, or other suitable types of aircraft.

Although the illustrative examples for an illustrative embodiment are described with respect to an aircraft, the illustrative embodiments may be applied to other types of structures. The structure may be, for example, a mobile structure, a stationary structure, a land-based structure, an aquatic-based structure, or a space-based structure. More specifically, the structure may be a surface ship, a tank, a personnel carrier, a train, a spacecraft, a space station, a satellite, a submarine, a manufacturing facility, a building, or other suitable structures.

Figure 2:
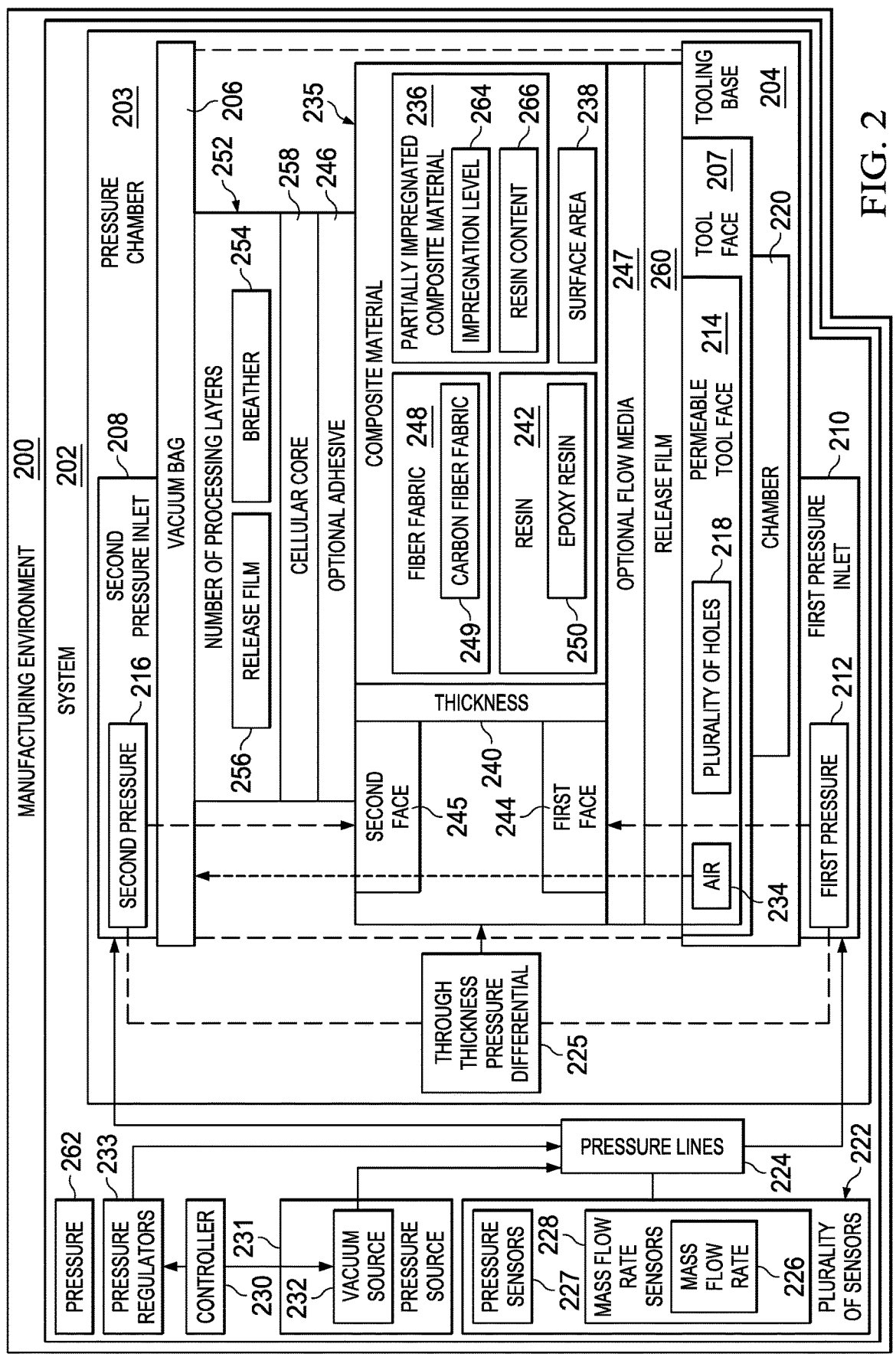
FIG. 2 is an illustration of a block diagram of a manufacturing environment in accordance with an illustrative embodiment.
Figure 3:
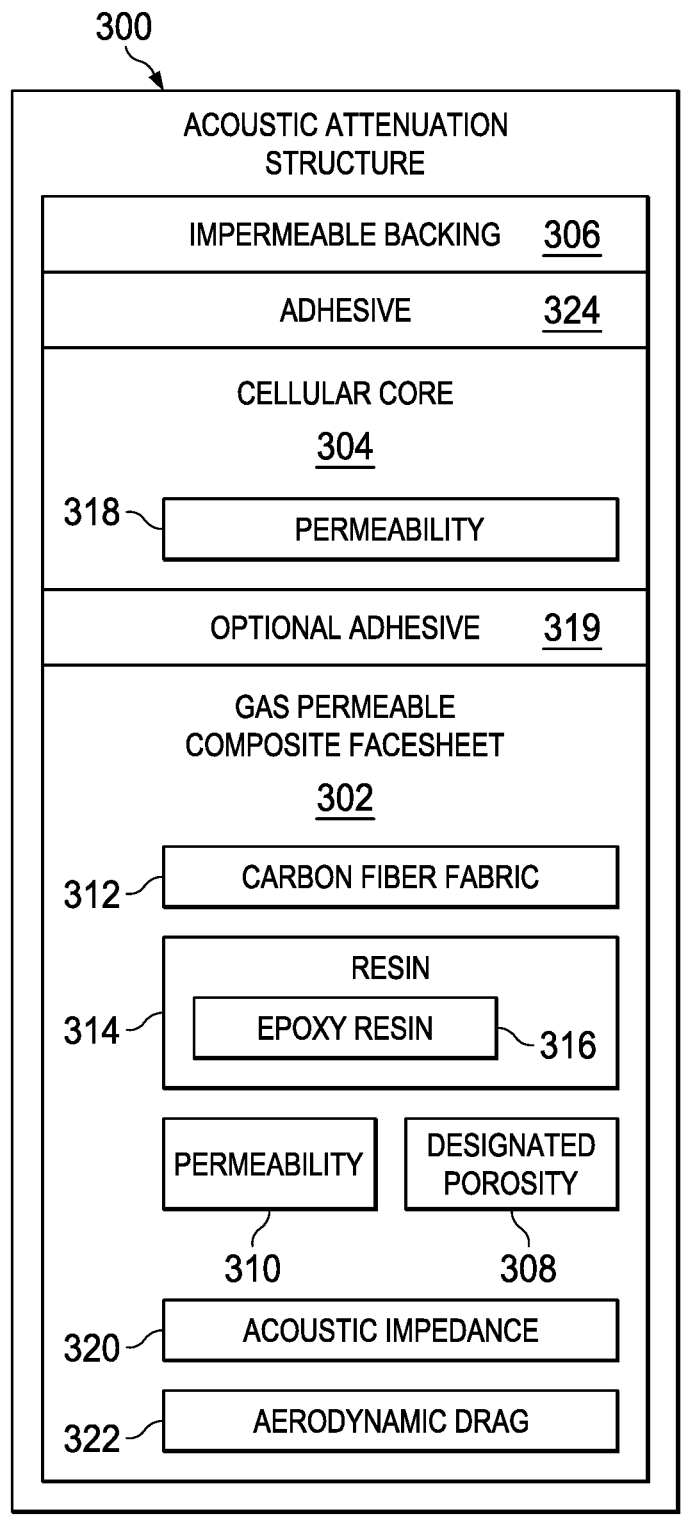
FIG. 3 is an illustration of a block diagram of an acoustic attenuation structure in accordance with an illustrative embodiment.

Turning now to FIG. 2, an illustration of a block diagram of a manufacturing environment is depicted in accordance with an illustrative embodiment. Manufacturing environment 200 is a depiction of an environment in which components for an acoustic attenuation structure, such as acoustic attenuation structure 300 of FIG. 3 are manufactured. Components for an acoustic attenuation structure for aircraft 100 may be manufactured in manufacturing environment 200.

System 202 includes pressure chamber 203. Pressure chamber 203 is formed by any desirable structures. In some illustrative examples, pressure chamber 203 includes tooling base 204 and vacuum bag 206.

In these illustrative examples, system 202 includes tooling base 204 and vacuum bag 206. Tooling base 204 has tool face 207. In some illustrative examples, tool face 207 is gas impermeable. In some illustrative examples, tool face 207 takes the form of permeable tool face 214.

In some illustrative examples, system 202 includes tooling base 204, vacuum bag 206, and second pressure inlet 208. Tooling base 204 has first pressure inlet 210 supplying first pressure 212 to permeable tool face 214 of tooling base 204. Vacuum bag 206 is sealed to tooling base 204. Second pressure inlet 208 supplies second pressure 216 through vacuum bag 206. Second pressure 216 is less than first pressure 212.

Permeable tool face 214 may be permeable due to any desirable design or material characteristics for permeable tool face 214. In some illustrative examples, permeable tool face 214 is uniformly porous. In these illustrative examples, the porosity of permeable tool face 214 provides the permeability of permeable tool face 214. As used herein, permeability refers to gas permeability. Plurality of holes 218 allows first pressure 212 to travel through permeable tool face 214.

In some illustrative examples, permeable tool face 214 is formed of a porous metal. In one illustrative example, permeable tool face 214 is formed of sintered metal. In another illustrative example, permeable tool face 214 is formed of porous aluminum. In a further illustrative example, permeable tool face 214 is formed of metal foam. In a yet further illustrative example, permeable tool face 214 is formed of porous steel.

In some illustrative examples, permeable tool face 214 has plurality of holes 218. In these illustrative examples, plurality of holes 218 provides the permeability of permeable tool face 214.

In some illustrative examples, first pressure 212, supplied by first pressure inlet 210, enters chamber 220 of tooling base 204. In these illustrative examples, chamber 220 feeds first pressure 212 to plurality of holes 218 of permeable tool face 214.

System 202 further comprises plurality of sensors 222 connected to pressure lines 224 connected to first pressure inlet 210 and second pressure inlet 208. When pressure source 231 takes the form of vacuum source 232, pressure lines 224 take the form of vacuum lines.

Plurality of sensors 222 is configured to monitor at least one of through thickness pressure differential 225 within system 202, or mass flow rate 226. Plurality of sensors 222 comprises at least one of pressure sensors 227 or mass flow rate sensors 228.

Controller 230 is configured to control at least one of pressure source 231 or pressure regulators 233. In some illustrative examples, pressure source 231 takes the form of vacuum source 232.

Controller 230 may be implemented in at least one of hardware or software. Controller 230 controls at least one of pressure source 231 or pressure regulators 233 based on measurements obtained from plurality of sensors 222. Controller 230 may change at least one of first pressure 212 or second pressure 216 provided by pressure source 231 based on measurements obtained from plurality of sensors 222.

Controlling first pressure 212 or second pressure 216 provided by pressure source 231 based on measurements obtained from plurality of sensors 222 controls the amount of air 234 traveling through composite material 235. Mass flow rate 226 is a rate of flow of air 234 through composite material 235. Controlling the amount of air 234 traveling through composite material 235 controls the porosity within the composite material 235 during heating.

System 202 comprises pressure chamber 203 and composite material 235 positioned within pressure chamber 203. Composite material 235 is positioned within pressure chamber 203 such that composite material 235 acts as a rate limiting structure for movement of air 234 between first pressure 212 within pressure chamber 203 and second pressure 216 within pressure chamber 203. In some illustrative examples, composite material 235 is an uncured composite material.

In some illustrative examples, system 202 includes tooling base 204, vacuum bag 206 sealed to tooling base 204, and composite material 235. Composite material 235 is positioned between tooling base 204 and the vacuum bag 206. Composite material 235 forms a rate limiting structure for movement of air 234 through system 202. Movement of air 234 in system 202 is a movement of air 234 from first pressure 212 on first face 244 of composite material 235 to second pressure 216 on second face 245 of composite material 235. In some illustrative examples, composite material 235 is uncured.

Tool face 207 is configured to shape composite material 235 to form a gas permeable composite facesheet of an acoustic attenuation structure, such as gas permeable composite facesheet 302 of FIG. 3. When tool face 207 takes the form of permeable tool face 214, Permeable tool face 214 is configured to shape composite material 235 to form a gas permeable composite facesheet of an acoustic attenuation structure, such as gas permeable composite facesheet 302 of FIG. 3. In some illustrative examples, composite material 235 is non-planar prior to being placed on permeable tool face 214. In these illustrative examples, composite material 235 may be shaped prior to being placed on permeable tool face 214. In other illustrative examples, composite material 235 is shaped by permeable tool face 214 prior to flowing air 234 and prior to placing cellular core 258. Composite material 235 may be placed into any desirable shape or contour.

In these illustrative examples, the resulting gas permeable composite facesheet has a designated porosity that causes the permeability of the gas permeable composite facesheet. Controlling air 234 through composite material 235 controls the permeability of the gas permeable composite facesheet.

The permeability of the resulting gas permeable composite facesheet, such as gas permeable composite facesheet 302 of FIG. 3, is affected by through thickness pressure differential 225, surface area 238 of composite material 235, thickness 240 of composite material 235, and a viscosity of air 234 going through composite material 235. The permeability of each component in FIG. 2 is considered in a through-thickness direction moving between tooling base 204 and vacuum bag 206.

The permeability is affected by through thickness pressure differential 225 according to the equation $$Q = -\frac{kA(p_b - p_a)}{\mu L},$$

wherein "Q" is mass flow rate 226, "k" is the permeability, "A" is surface area 238 of composite material 235, $(p_b-p_a)$ is through thickness pressure differential 225, p is the viscosity of air 234 going through composite material 235, and "L" is thickness 240 of composite material 235. The permeability of the resulting gas permeable composite facesheet may be changed by changing through thickness pressure differential 225. Changing through thickness pressure differential 225 also changes the amount of air 234 going through composite material 235.

In some illustrative examples, applying through thickness pressure differential 225 to composite material 235 comprises supplying first pressure 212 to first face 244 of composite material 235 through permeable tool face 214. In these illustrative examples, applying through thickness pressure differential 225 further comprises supplying second pressure 216 to second face 245 of composite material 235, wherein first pressure 212 is greater than second pressure 216.

First pressure 212 extends through portions of system 202 between tooling base 204 and first face 244 of composite material 235. First pressure 212 is present in release film 260 and optional flow media 247. Second pressure 216 extends through portions of system 202 between vacuum bag 206 and second face 245 of composite material 235. Second pressure 216 is present in number of processing layers 252, cellular core 258, and optional adhesive 246, if present.

In these illustrative examples, first pressure 212 being greater than second pressure 216 forces air 234 through composite material 235. The difference in first pressure 212 and second pressure 216 creates through thickness pressure differential 225. Changing a difference in pressure between first pressure 212 and second pressure 216 changes through thickness pressure differential 225. Changing through thickness pressure differential 225 changes the amount of air 234 sent through composite material 235. Changing the amount of air 234 traveling through composite material 235 changes the permeability of the resulting gas permeable composite facesheet, such as gas permeable composite facesheet 302 of FIG. 3.

Controller 230 controls at least one of pressure source 231 or pressure regulators 233 to change the amount of air 234 going through composite material 235. The amount of air 234 is changed by changing at least one of first pressure 212 or second pressure 216 to change through thickness pressure differential 225.

In some illustrative examples, applying through thickness pressure differential 225 to composite material 235 comprises supplying first pressure 212 to first face 244 of composite material 235 through optional flow media 247 contacting first face 244 of composite material 235. In these illustrative examples, tooling base 204 may not have permeable tool face 214 or chamber 220. In these illustrative examples, tooling base 204 has tool face 213 that is impermeable. In some illustrative examples, optional flow media 247 further disperses first pressure 212 from plurality of holes 218 of permeable tool face 214.

Composite material 235 comprises fiber fabric 248 and resin 242. Fiber fabric 248 takes the form of any type of fabric having a desirable strength, a desirable reactivity, a desirable weight, a desirable weave, a desirable openness, a desirable wettability, and produces a desirable permeability.

Fiber fabric 248 may be a woven or a non-woven mat. In some illustrative examples, fiber fabric 248 is chosen from plain weave, leno, twill, satin, or any other desirable weave. The openness of fiber fabric 248 is also related to the permeability of the resulting gas permeable composite facesheet.

Fiber fabric 248 includes any desirable type of fibers or combination of types of fibers. In some illustrative examples, fiber fabric 248 includes glass fibers. In some illustrative examples, fiber fabric 248 includes aramid fibers. In some illustrative examples, fiber fabric 248 comprises carbon fibers and is referred to as carbon fiber fabric 249.

Resin 242 is any desirable type of resin. In some illustrative examples, resin 242 is a thermoset resin. When resin 242 is a thermoset resin, composite material 235 may be referred to as thermoset composite material. When resin 242 is a thermoset resin, heating composite material 235 will cure composite material 235 to form a resulting gas permeable composite facesheet, such as gas permeable composite facesheet 302 of FIG. 3.

In some illustrative examples, resin 242 is a thermoplastic resin. When resin 242 is a thermoplastic resin, composite material 235 may be referred to as thermoplastic composite material. When resin 242 is a thermoplastic resin, heating and subsequently cooling composite material 235 will consolidate composite material 235 to form a resulting gas permeable composite facesheet, such as gas permeable composite facesheet 302 of FIG. 3.

Resin 242 may be selected based on any desirable material characteristic. Resin 242 may be selected based on at least one of cure time, cure temperature, weight, viscosity, or any other desirable material characteristic. In some illustrative examples, the resin of composite material 235 has a minimum resin viscosity during cure in the range of 1 to 1000 Poise.

In some illustrative examples, resin 242 is bismaleimide. In other illustrative examples, resin 242 is benzoxazine. In some illustrative examples, resin 242 is a phenolic. In other illustrative examples, resin 242 is a polyimide resin. A polyimide resin may be desirable for high temperature applications.

In some illustrative examples, resin 242 is epoxy resin 250. In some illustrative examples, epoxy resin 250 is hot-melt filmed and has little flow (high min viscosity during curing).

Fiber fabric 248 includes any desirable number of layers. The target permeability will change if the number of composite plies in composite material 235 changes. A higher permeability fabric will be used for fiber fabric 248 if more plies are desired in composite material 235, to maintain the same flow rate.

Composite material 235 is a partially impregnated prepreg with dry fiber in the center. By changing at least one of resin content of composite material 235, weave style of fiber fabric 248, openness of fiber fabric 248, or impregnation level 264 of composite material 235, the resulting permeability of a gas permeable composite facesheet may be further tailored.

In some illustrative examples, partially impregnated composite material 236 has impregnation level 264 in the range of seventy five percent to ninety five percent. In some illustrative examples, partially impregnated composite material 236 has resin content 266 between twenty weight percent and forty weight percent.

System 202 used to cure composite material 235 further comprises number of processing layers 252. Number of processing layers 252 comprises at least one of breather 254 or release film 256. Number of processing layers 252 has a higher permeability than the resulting gas permeable composite facesheet, such as gas permeable composite facesheet 302 of FIG. 3.

In this illustrative example, release film 256 and breather 254 are placed over cellular core 258. Release film 256 and breather 254 are between cellular core 258 and vacuum bag 206. Release film 260 is also one of number of processing layers 252. Release film 260 of number of processing layers 252 is positioned between composite material 235 and tooling base 204. Cellular core 258 also has a permeability higher than the resulting permeability of the gas permeable composite facesheet.

Cellular core 258 is formed from any desirable material. Cellular core 258 has any desirable shape or design. In some illustrative examples, cellular core 258 takes the form of at least one of a honeycomb core, a square core, a triangular core, a hat-shaped core, or a core with any other desirable cell shape. A honeycomb core has cells with a hexagonal cross-sectional shape. A square core has cells with a square cross-sectional shape.

When cellular core 258 is present in system 202 during processing of composite material 235, cellular core 258 is bonded to composite material 235 during processing of composite material 235. When cellular core 258 is present in system 202 during processing of composite material 235, processing composite material 235 and bonding composite material 235 to cellular core 258 takes place in a single manufacturing step. By bonding composite material 235 to cellular core 258 and processing composite material 235 in a single manufacturing step, manufacturing time is reduced. By bonding composite material 235 to cellular core 258 and processing composite material 235 in a single manufacturing step, a conventional separate bonding step is eliminated.

When cellular core 258 is bonded to composite material 235 during processing of composite material 235, permeability may be reduced directly under the walls of cellular core 258. The walls of cellular core 258 may block the small surface area of composite material 235 upon which the walls of cellular core 258 sit. During processing, air 234 may divert around the walls of cellular core 258. Thus, the path of air 234 may be influenced by the shape of cellular core 258.

Through thickness pressure differential 225 is chosen taking into account pressure 262 outside of pressure chamber 203 formed by vacuum bag 206 and tooling base 204. Pressure 262 may be referred to as an environmental pressure or a surrounding pressure. Pressure 262 is independent of first pressure 212 and second pressure 216. Pressure 262 is greater than first pressure 212.

If pressure chamber 203, including vacuum bag 206 and tooling base 204, is processed in an oven, pressure 262 is atmospheric pressure, 1 atm. If pressure chamber 203 including vacuum bag 206 and tooling base 204 is processed in an autoclave, pressure 262 is between atmospheric pressure and 6 atm.

Pressure 262 being greater than first pressure 212 prevents vacuum bag 206 from inflating. Pressure 262 being greater than first pressure 212 maintains intimate contact between cellular core 258 and composite material 235 to create a sufficiently strong structural bond. Pressure 262 being greater than first pressure 212 maintains a force on composite material 235 on tooling base 204.

In some illustrative examples, system 202 comprises tooling base 204 and vacuum bag 206. Tooling base 204 has first pressure 212 on tool face 207 of tooling base 204. Vacuum bag 206 is sealed to tooling base 204. Second pressure 216 is supplied through vacuum bag 206. First pressure 212 and second pressure 216 are lower than pressure 262 outside of vacuum bag 206.

When air 234 flows from tooling base 204 towards vacuum bag 206, any of resin 242 flowing out of composite material 235 will adhere to cellular core 258. When air 234 flows from tooling base 204 towards vacuum bag 206, maintenance of tooling base 204 is reduced. When first pressure 212 is greater than second pressure 216, any of resin 242 flowing out of composite material 235 will adhere to cellular core 258. When first pressure 212 is greater than second pressure 216, maintenance of tooling base 204 is reduced.

If air 234 flows from vacuum bag 206 towards tooling base 204, resin 242 may flow into tooling base 204. When first pressure 212 is greater than second pressure 216, resin 242 may flow into tooling base 204. When resin 242 flows into tooling base 204, additional components that are not depicted may be present to keep resin 242 out of at least one of pressure lines 224 or pressure source 231.

The illustration of manufacturing environment 200 in FIG. 2 is not meant to imply physical or architectural limitations to the manner in which an illustrative embodiment may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

For example, both optional flow media 247 and permeable tool face 214 are depicted. In some illustrative examples, optional flow media 247 may not be present. In other illustrative examples, permeable tool face 214 and chamber 220 may not be present.

In some illustrative examples, optional adhesive 246 is present. When present, curing optional adhesive 246 while curing composite material 235 joins the resulting gas permeable composite facesheet and cellular core 258. When optional adhesive 246 is not present, resin 242 joins the resulting gas permeable composite facesheet and cellular core 258.

In some illustrative examples, temperature sensors (not depicted) are present in system 202. The temperature sensors (not depicted) may be used to monitor the temperature of composite material 235 during heating. When composite material 235 is a thermoset, temperature sensors (not depicted) may be used during the curing process.

Turning now to FIG. 3, an illustration of a block diagram of an acoustic attenuation structure is depicted in accordance with an illustrative embodiment. Acoustic attenuation structure 300 is a depiction, in block form, of an acoustic attenuation structure that may be used in aircraft 100. Acoustic attenuation structure 300 is a depiction, in block form, of a product formed using gas permeable composite facesheet 302 manufactured in manufacturing environment 200 of FIG. 2.

Gas permeable composite facesheet 302 has any desirable shape or contour. In some illustrative examples, the composite material used to form gas permeable composite facesheet 302 was shaped prior to being placed on the processing tooling. In other illustrative examples, the composite material was shaped by the processing tooling prior to flowing air to form gas permeable composite facesheet 302. A shape or contour for gas permeable composite facesheet 302 may be formed prior to bonding to cellular core 304.

Acoustic attenuation structure 300 comprises gas permeable composite facesheet 302, cellular core 304, and impermeable backing 306. Gas permeable composite facesheet 302 is an example of a result of flowing air 234 through composite material 235 using system 202 of FIG. 2.

Gas permeable composite facesheet 302 does not have any perforations. Instead, gas permeable composite facesheet 302 has designated porosity 308. Designated porosity 308 causes permeability 310 of gas permeable composite facesheet 302. Designated porosity 308 may include pathways that are not perpendicular to the surface of gas permeable composite facesheet 302. In some illustrative examples, designated porosity 308 may not be visible. Designated porosity 308 is significantly smoother than the rough edges of the drilled or punched perforations of conventional facesheets.

Gas permeable composite facesheet 302 comprises fiber fabric 312. Gas permeable composite facesheet 302 also comprises resin 314. In some illustrative examples, resin 314 is epoxy resin 316 so that gas permeable composite facesheet 302 comprises epoxy resin 316.

In some illustrative examples, gas permeable composite facesheet 302 is bonded to cellular core 304 using resin 314 of gas permeable composite facesheet 302 without any additional adhesive. When cellular core 304 is bonded to gas permeable composite facesheet 302 during processing, permeability may be reduced directly under the walls of cellular core 304. The walls of cellular core 304 may block the small surface area of gas permeable composite facesheet 302 upon which the walls of cellular core 304 sit. During processing, air traveling through the composite material to create gas permeable composite facesheet 302 may divert around the walls of cellular core 304. Thus, the path of the air during processing may be influenced by the shape of cellular core 304.

In one non-limiting illustrative example, acoustic attenuation structure 300 comprises gas permeable composite facesheet 302, cellular core 304, and impermeable backing 306. Gas permeable composite facesheet 302 has designated porosity 308, wherein designated porosity 308 causes permeability 310 of gas permeable composite facesheet 302. Cellular core 304 is bonded to gas permeable composite facesheet 302 using resin 314 of gas permeable composite facesheet 302 without any additional adhesive. Impermeable backing 306 is connected to cellular core 304.

When resin 314 bonds gas permeable composite facesheet 302 to cellular core 304, gas permeable composite facesheet 302 is cured while contacting cellular core 304. In these illustrative examples, gas permeable composite facesheet 302 is formed in a system, such as system 202 of FIG. 2, with cellular core 304 present. In these illustrative examples, forming gas permeable composite facesheet 302 and bonding to cellular core 304 is performed in one manufacturing step.

Cellular core 304 has permeability 318. When cellular core 304 is bonded to gas permeable composite facesheet 302 in the system while gas permeable composite facesheet 302 is formed, permeability 318 is greater than permeability 310. When cellular core 304 is bonded to gas permeable composite facesheet 302 during curing of gas permeable composite facesheet 302, permeability 318 of cellular core 304 should not present an obstruction to the through thickness pressure differential during processing, such as through thickness pressure differential 225 of FIG. 2.

In some illustrative examples, gas permeable composite facesheet 302 is bonded to cellular core 304 during curing or consolidating of gas permeable composite facesheet 302 using only resin 314. In other illustrative examples, gas permeable composite facesheet 302 is bonded to cellular core 304 during curing or consolidation of gas permeable composite facesheet 302 using resin 314 and optional adhesive 319.

When cellular core 304 is bonded to gas permeable composite facesheet 302 during processing, cellular core 304 may be an example of cellular core 258 in a resulting product. When cellular core 304 is present in a system, such as system 202 of FIG. 2, during processing of composite material to form gas permeable composite facesheet 302, cellular core 304 is bonded to gas permeable composite facesheet 302 during processing of gas permeable composite facesheet 302. When cellular core 304 is present in a system during processing of a composite material to form gas permeable composite facesheet 302, processing the composite material and bonding the composite material to cellular core 304 takes place in a single manufacturing step. By bonding gas permeable composite facesheet 302 to cellular core 304 and processing the composite material to form gas permeable composite facesheet 302 in a single manufacturing step, manufacturing time is reduced. By bonding the composite material to cellular core 304 and processing the composite material to form gas permeable composite facesheet 302 in a single manufacturing step, a conventional separate bonding step is eliminated.

In some other illustrative examples, gas permeable composite facesheet 302 is bonded to cellular core 304 after gas permeable composite facesheet 302 is formed. In these illustrative examples, gas permeable composite facesheet 302 is formed in a system, such as system 202, without cellular core 304 in the system. After gas permeable composite facesheet 302 is formed using the system, gas permeable composite facesheet 302 is bonded to cellular core 304 using optional adhesive 319 in a separate manufacturing step.

Permeability 310 may be selected taking into account at least one of type of cellular core 304, location of cellular core 304, location of optional adhesive 319. For example, permeability 310 may be selected taking into account that walls of cellular core 304 will block small portions of the inner surface of gas permeable composite facesheet 302 where cellular core 304 is adhered to gas permeable composite facesheet 302. For example, permeability 310 may be greater than a desired permeability to compensate for the walls of cellular core 304 blocking small portions of the inner surface of gas permeable composite facesheet 302.

Acoustic impedance 320 of gas permeable composite facesheet 302 may have any desirable value. In some illustrative examples, gas permeable composite facesheet 302 has acoustic impedance 320 between forty cgs Rayls and ninety cgs Rayls.

When gas permeable composite facesheet 302 is attached to an aerodynamic surface, gas permeable composite facesheet 302 has aerodynamic drag 322. Aerodynamic drag 322 of gas permeable composite facesheet 302 is less than a composite facesheet with perforations having a same permeability as gas permeable composite facesheet 302.

Perforations may increase aerodynamic drag due to friction. Gas permeable composite facesheet 302 is smoother than a composite facesheet with perforations. Increasing smoothness reduces the aerodynamic drag. Gas permeable composite facesheet 302 has less friction than a composite facesheet with perforations. Reducing friction reduces the aerodynamic drag. Aerodynamic drag 322 of gas permeable composite facesheet 302 is less than a composite facesheet with perforations having a same permeability as gas permeable composite facesheet 302.

Cellular core 304 may be connected to impermeable backing 306 using any desirable method. As depicted, cellular core 304 is connected to impermeable backing 306 using adhesive 324. Any surface treatment layers applied to or within acoustic attenuation structure 300, such as optional adhesive 319, adhesive 324, paint, or other treatment layer are processed to provide a desirable permeability. For example, treatment layers may be processed using at least one of heat or pressure to create permeability in the treatment layer.

The illustration of acoustic attenuation structure 300 in FIG. 3 is not meant to imply physical or architectural limitations to the manner in which an illustrative embodiment may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

For example, although not depicted, gas permeable composite facesheet 302 comprises any desirable quantity of layers of fiber fabric 312 and resin 314. In some illustrative examples, gas permeable composite facesheet 302 contains only one layer of fiber fabric 312 with resin 314. In other illustrative examples, gas permeable composite facesheet 302 comprises more than one layer of fiber fabric 312 with resin 314. For example, gas permeable composite facesheet 302 may include two, three, four, or more than four layers of fiber fabric 312 and resin 314.

A desirable quantity of layers of fiber fabric 312 and resin 314 is influenced by a desired structural strength for acoustic attenuation structure 300. A desirable quantity of layers of fiber fabric 312 and resin 314 is also influenced by a desirable weight for acoustic attenuation structure 300. In an aircraft application, the weight of acoustic attenuation structure 300 is desirably minimized.

Figure 4:
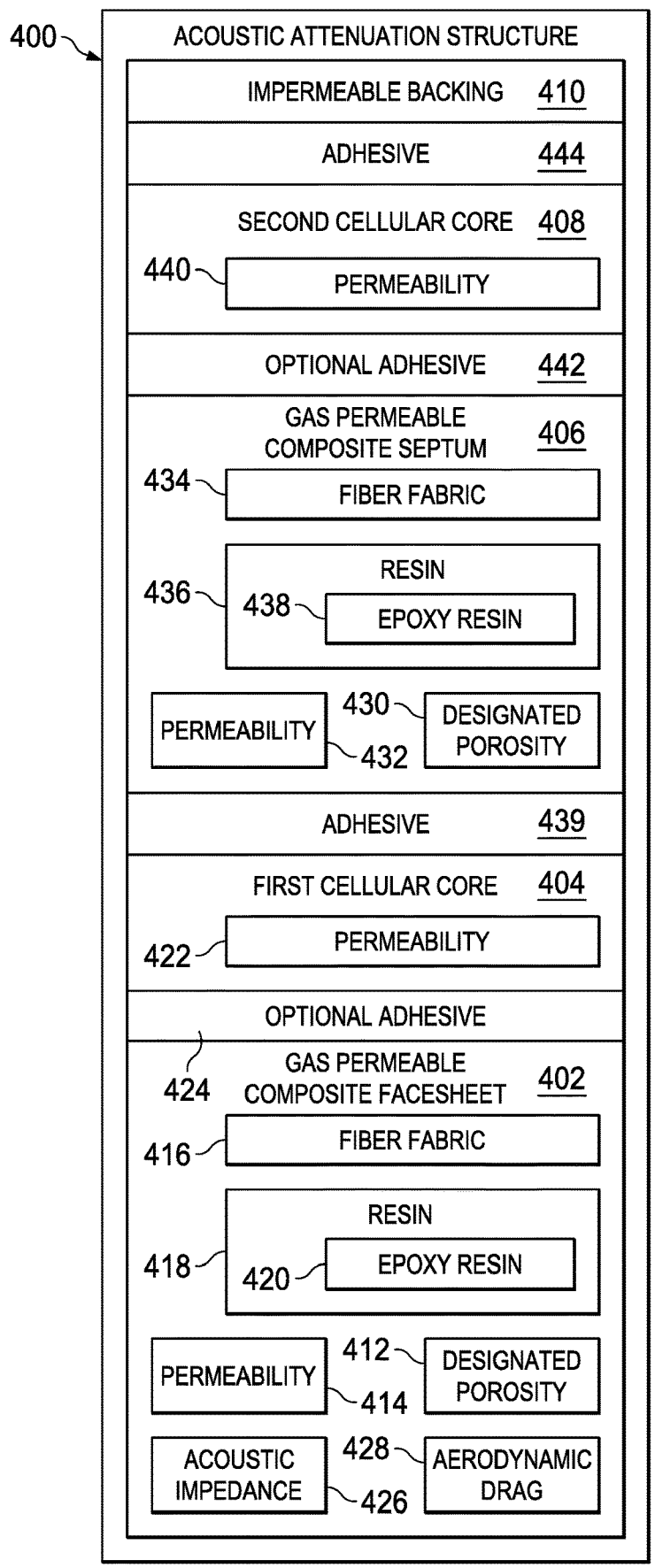
FIG. 4 is an illustration of a block diagram of an acoustic attenuation structure in accordance with an illustrative embodiment.

Turning now to FIG. 4, an illustration of a block diagram of an acoustic attenuation structure is depicted in accordance with an illustrative embodiment. Acoustic attenuation structure 400 is a depiction, in block form, of an acoustic attenuation structure that may be used in aircraft 100. Acoustic attenuation structure 400 is a depiction, in block form, of a product formed using components manufactured in manufacturing environment 200 of FIG. 2.

Acoustic attenuation structure 400 comprises gas permeable composite facesheet 402, first cellular core 404, gas permeable composite septum 406, second cellular core 408, and impermeable backing 410. In some illustrative examples, gas permeable composite facesheet 402 is an example of a result of flowing air 234 through composite material 235 using system 202 of FIG. 2. In some illustrative examples, gas permeable composite septum 406 is an example of a result of flowing air 234 through composite material 235 using system 202 of FIG. 2.

Gas permeable composite facesheet 402 and gas permeable composite septum 406 each have any desirable shape or contour. In some illustrative examples, the composite material used to form gas permeable composite facesheet 402 or gas permeable composite septum 406 are shaped prior to being placed on the processing tooling. In other illustrative examples, the composite material was shaped by the processing tooling prior to flowing air to form gas permeable composite facesheet 402 or gas permeable composite septum 406. A shape or contour for gas permeable composite facesheet 402 or gas permeable composite septum 406 may be formed prior to bonding to any respective cellular core, such as first cellular core 404 or second cellular core 408.

Gas permeable composite facesheet 402 has designated porosity 412. Designated porosity 412 causes permeability 414 of gas permeable composite facesheet 402. Gas permeable composite facesheet 402 comprises fiber fabric 416.

Gas permeable composite facesheet 402 also comprises resin 418. In some illustrative examples, resin 418 is epoxy resin 420 so that gas permeable composite facesheet 402 comprises epoxy resin 420.

In some illustrative examples, gas permeable composite facesheet 402 is bonded to first cellular core 404 using resin 418 of gas permeable composite facesheet 402 without any additional adhesive. When resin 418 bonds gas permeable composite facesheet 402 to first cellular core 404, gas permeable composite facesheet 402 is cured or consolidated while contacting first cellular core 404. In these illustrative examples, gas permeable composite facesheet 402 is formed in a system, such as system 202 of FIG. 2, with first cellular core 404 present. In these illustrative examples, forming gas permeable composite facesheet 402 and bonding to first cellular core 404 is performed in one manufacturing step.

First cellular core 404 has permeability 422. When first cellular core 404 is bonded to gas permeable composite facesheet 402 in the system while gas permeable composite facesheet 402 is formed, permeability 422 is greater than permeability 414. When first cellular core 404 is bonded to gas permeable composite facesheet 402 during curing of gas permeable composite facesheet 402, permeability 422 of first cellular core 404 should not present an obstruction to the through thickness pressure differential during processing, such as through thickness pressure differential 225 of FIG. 2.

In some illustrative examples, gas permeable composite facesheet 402 is bonded to first cellular core 404 during curing or consolidation of gas permeable composite facesheet 402 using only resin 418. In other illustrative examples, gas permeable composite facesheet 402 is bonded to first cellular core 404 during curing or consolidation of gas permeable composite facesheet 402 using resin 418 and optional adhesive 424.

In some other illustrative examples, gas permeable composite facesheet 402 is bonded to first cellular core 404 after gas permeable composite facesheet 402 is formed. In these illustrative examples, gas permeable composite facesheet 402 is formed in a system, such as system 202, without first cellular core 404 in the system. After gas permeable composite facesheet 402 is formed using the system, gas permeable composite facesheet 402 is bonded to first cellular core 404 using optional adhesive 424 in a separate manufacturing step.

Acoustic impedance 426 of gas permeable composite facesheet 402 may have any desirable value. In some illustrative examples, gas permeable composite facesheet 402 has acoustic impedance 426 between forty cgs Rayls and ninety cgs Rayls.

When gas permeable composite facesheet 402 is attached to an aerodynamic surface, gas permeable composite facesheet 402 has aerodynamic drag 428. Aerodynamic drag 428 of gas permeable composite facesheet 402 is less than a composite facesheet with perforations having a same permeability as gas permeable composite facesheet 402.

Perforations may increase aerodynamic drag due to friction. Gas permeable composite facesheet 402 is smoother than a composite facesheet with perforations. Gas permeable composite facesheet 402 has less friction than a composite facesheet with perforations. Reducing friction reduces the aerodynamic drag. Aerodynamic drag 428 of gas permeable composite facesheet 402 is less than a composite facesheet with perforations having a same permeability as gas permeable composite facesheet 402.

In some illustrative examples, gas permeable composite septum 406 is an example of a result of flowing air 234 through composite material 235 using system 202 of FIG. 2. Gas permeable composite septum 406 has designated porosity 430. Designated porosity 430 causes permeability 432 of gas permeable composite septum 406. Gas permeable composite septum 406 comprises fiber fabric 434.

Gas permeable composite septum 406 also comprises resin 436. In some illustrative examples, resin 436 is epoxy resin 438 so that gas permeable composite septum 406 comprises epoxy resin 438.

In some illustrative examples, gas permeable composite septum 406 is bonded to first cellular core 404 using resin 436 of gas permeable composite septum 406 without any additional adhesive. When resin 436 bonds gas permeable composite septum 406 to first cellular core 404, gas permeable composite septum 406 is cured or consolidated while contacting first cellular core 404. In these illustrative examples, gas permeable composite septum 406 is formed in a system, such as system 202 of FIG. 2, with first cellular core 404 present. In these illustrative examples, forming gas permeable composite septum 406 and bonding to first cellular core 404 is performed in one manufacturing step. In these illustrative examples, gas permeable composite facesheet 402 is not processed with first cellular core 404. Only one of gas permeable composite facesheet 402 or gas permeable composite septum 406 will be processed with first cellular core 404.

As depicted, first cellular core 404 is connected to permeable composite septum 406 by adhesive 439. As discussed above, in some illustrative examples, adhesive 439 is optional. In some other illustrative examples, adhesive 439 is used to connect gas permeable composite septum 406 and first cellular core 404 after processing gas permeable composite septum 406. In some illustrative examples, adhesive 439 is present between permeable composite septum 406 and first cellular core 404 while processing gas permeable composite septum 406.

When adhesive, such as optional adhesive 424, adhesive 439, optional adhesive 442, or adhesive 444 is present, processing may be performed on the adhesive to improve the permeability of the adhesive. For example, adhesive 439 may be reticulated prior to adhering to gas permeable composite septum 406. Adhesive 439 may be reticulated using temperature and pressure. In some illustrative examples, reticulating adhesive 439 creates adhesive beads on walls of first cellular core 404. In some illustrative examples, at least one of the type of adhesive or the method of application of adhesive for at least one of optional adhesive 424, adhesive 439, optional adhesive 442, or adhesive 444 is selected to provide a desirable permeability for the adhesive. In one illustrative example, the adhesive may only be applied to the walls of the cellular cores rather than as a sheet.

Gas permeable composite septum 406 is connected to second cellular core 408. In some illustrative examples, gas permeable composite septum 406 is bonded to second cellular core 408 using resin 436 of gas permeable composite septum 406 without any additional adhesive. When resin 436 bonds gas permeable composite septum 406 to second cellular core 408, gas permeable composite septum 406 is cured or consolidated while contacting second cellular core 408. In these illustrative examples, gas permeable composite septum 406 is formed in a system, such as system 202 of FIG. 2, with second cellular core 408 present. In these illustrative examples, forming gas permeable composite septum 406 and bonding to second cellular core 408 is performed in one manufacturing step. When second cellular core 408 is bonded to gas permeable composite septum 406 during curing of gas permeable composite septum 406, permeability 440 of second cellular core 408 should not present an obstruction to the through thickness pressure differential during processing, such as through thickness pressure differential 225 of FIG. 2.

In other illustrative examples, gas permeable composite septum 406 is bonded to second cellular core 408 during curing or consolidation of gas permeable composite septum 406 using resin 436 and optional adhesive 442.

In some other illustrative examples, gas permeable composite septum 406 is bonded to second cellular core 408 after gas permeable composite septum 406 is formed. In these illustrative examples, gas permeable composite septum 406 is formed in a system, such as system 202 of FIG. 2, without second cellular core 408 in the system. After gas permeable composite septum 406 is formed using the system, gas permeable composite septum 406 is bonded to second cellular core 408 using optional adhesive 442 in a separate manufacturing step.

Second cellular core 408 may be connected to impermeable backing 410 using any desirable method. As depicted, second cellular core 408 is connected to impermeable backing 410 using adhesive 444.

Any surface treatment layers applied to or within acoustic attenuation structure 400, such as optional adhesive 424, adhesive 439, optional adhesive 442, adhesive 444, paint, or other treatment layer are processed to provide a desirable permeability. For example, treatment layers may be processed using at least one of heat or pressure to create permeability in the treatment layer.

Permeability 414 and permeability 432 may be selected taking into account at least one of type of first cellular core 404, location of first cellular core 404, type of second cellular core 408, or location of second cellular core 408. For example, when first cellular core 404 is adhered after processing, permeability 414 may be selected taking into account that walls of first cellular core 404 will block small portions of the inner surface of gas permeable composite facesheet 402 where first cellular core 404 is adhered to gas permeable composite facesheet 402. As another non-limiting example, when second cellular core 408 is adhered after processing, permeability 432 may be selected taking into account that walls of second cellular core 408 will block small portions of the inner surface of gas permeable composite septum 406 where second cellular core 408 is adhered to gas permeable composite septum 406.

The illustration of acoustic attenuation structure 400 in FIG. 4 is not meant to imply physical or architectural limitations to the manner in which an illustrative embodiment may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

For example, although not depicted, gas permeable composite facesheet 402 comprises any desirable quantity of layers of fiber fabric 416 and resin 418. In some illustrative examples, gas permeable composite facesheet 402 contains only one layer of fiber fabric 416 with resin 418. In other illustrative examples, gas permeable composite facesheet 402 comprises more than one layer of fiber fabric 416 with resin 418. For example, gas permeable composite facesheet 402 may include two, three, four, or more than four layers of fiber fabric 416 and resin 418.

A desirable quantity of layers of fiber fabric 416 and resin 418 is influenced by a desired structural strength for acoustic attenuation structure 400. A desirable quantity of layers of fiber fabric 416 and resin 418 is also influenced by a desirable weight for acoustic attenuation structure 400. In an aircraft application, the weight of acoustic attenuation structure 400 is desirably minimized.

As another example, although not depicted, gas permeable composite septum 406 comprises any desirable quantity of layers of fiber fabric 434 and resin 436. In some illustrative examples, gas permeable composite septum 406 contains only one layer of fiber fabric 434 with resin 436. In other illustrative examples, gas permeable composite septum 406 comprises more than one layer of fiber fabric 434 with resin 436. For example, gas permeable composite septum 406 may include two, three, four, or more than four layers of fiber fabric 434 and resin 436.

A desirable quantity of layers of fiber fabric 434 and resin 436 is influenced by a desired structural strength for acoustic attenuation structure 400. A desirable quantity of layers of fiber fabric 434 and resin 436 is also influenced by a desirable weight for acoustic attenuation structure 400. In an aircraft application, the weight of acoustic attenuation structure 400 is desirably minimized.

Figure 5:
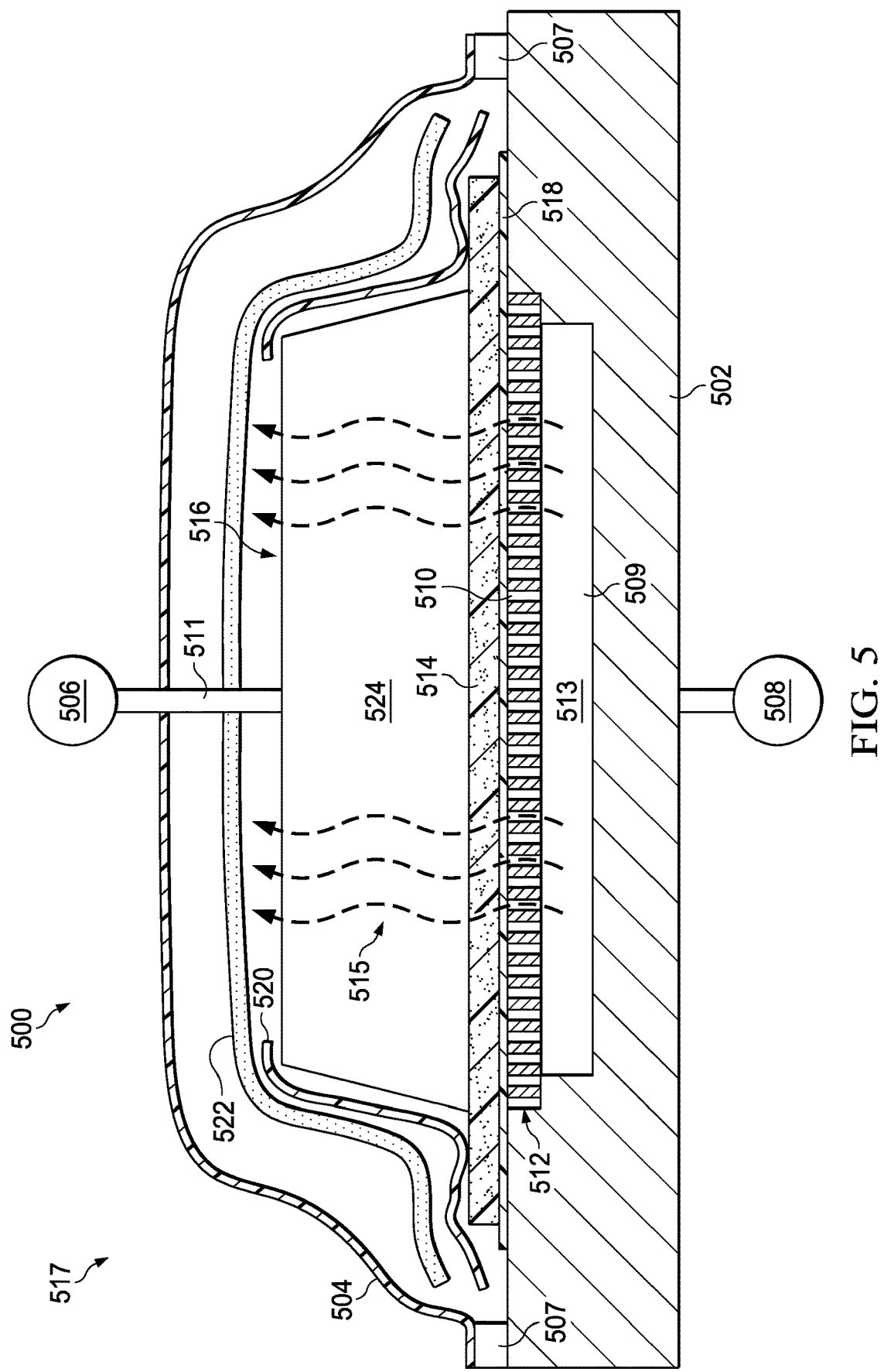
FIG. 5 is a cross-sectional view of a system for forming a gas permeable composite facesheet in accordance with an illustrative embodiment.

Turning now to FIG. 5, a cross-sectional view of a system for forming a gas permeable composite facesheet is depicted in accordance with an illustrative embodiment. System 500 is a physical implementation of system 202 of FIG. 2. System 500 is an example of a system for forming gas permeable composite facesheet 302 of FIG. 3. System 500 is an example of a system for forming at least one of gas permeable composite facesheet 402 or gas permeable composite septum 406 of FIG. 4.

System 500 comprises tooling base 502, vacuum bag 504 sealed to tooling base 502, and second pressure inlet 506. Vacuum bag 504 is sealed to tooling base 502 using any desirable method. As depicted, vacuum bag 504 is sealed to tooling base 502 using sealant 507.

Tooling base 502 has first pressure inlet 508 supplying first pressure 509 to permeable tool face 510. Second pressure inlet 506 supplies second pressure 511 through vacuum bag 504. As depicted, second pressure 511 is less than the first pressure 509.

As depicted, permeable tool face 510 comprises plurality of holes 512. As depicted, chamber 513 delivers first pressure 509 from first pressure inlet 508 to plurality of holes 512. Permeable tool face 510 is configured to shape composite material 514 to form a gas permeable composite facesheet of an acoustic attenuation structure.

In some illustrative examples, composite material 514 is non-planar prior to being placed on permeable tool face 510. In these illustrative examples, composite material 514 may be shaped prior to being placed on permeable tool face 510.

In other illustrative examples, composite material 514 is shaped by permeable tool face 510 prior to flowing air 515 and prior to placing cellular core 524. Composite material 514 may be placed into any desirable shape or contour.

In some illustrative examples, composite material 514 is a partially impregnated composite material. When composite material 514 is a partially impregnated composite material, there may be a nominal amount of resin leaving composite material 514 during processing. When composite material 514 is a partially impregnated composite material, the level of impregnation may be tailored. The level of impregnation may be chosen based on an amount of porosity to be imposed in composite material 514. In some illustrative examples, the partially impregnated composite material has an impregnation level in the range of seventy five percent to ninety five percent. The resin content may also be tailored. In some illustrative examples, the partially impregnated composite material has resin content between twenty weight percent and forty weight percent.

When composite material 514 is fully impregnated, extra resin may flow from composite material 514 during processing. Extra resin may flow into cellular core 524 when first pressure 509 is greater than second pressure 511.

System 500 further comprises number of processing layers 516. Number of processing layers 516 is a physical implementation of number of processing layers 252 of FIG. 2, comprising at least one of a breather or a release film. Each of number of processing layers 516 is positioned between vacuum bag 504 and tooling base 502. Each of number of processing layers 516 has a higher permeability than the gas permeable composite facesheet formed using system 500. Permeability of each component in FIG. 4 is considered in a through-thickness direction moving between tooling base 502 and vacuum bag 504.

By having a higher permeability than the permeable facesheet formed from curing composite material 514, number of processing layers 516 does not impede air 515 flowing through composite material 514. By number of processing layers 516 having a higher permeability than the permeable facesheet formed from curing composite material 514, composite material 514 becomes the rate limiting layer for the flow of air 515 between first pressure 509 and second pressure 511.

As depicted, system 500 is processed at pressure 517. Pressure 517 is the pressure within an oven or an autoclave containing system 500 as composite material 514 is cured. Pressure 517 is greater than both first pressure 509 and second pressure 511. Pressure 517 stops vacuum bag 504 from inflating.

In this illustrative example, number of processing layers 516 comprises release film 518, release film 520, and breather 522. Release film 518 desirably prevents resin from composite material 514 from entering plurality of holes 512. Release film 518 also desirably does not present a barrier to first pressure 509 passing through to composite material 514. Release film 518 is formed of any desirable material that has a higher permeability than the resulting gas permeable composite facesheet.

In this illustrative example, cellular core 524 sits on composite material 514. Pressure 517 holds cellular core 524 against composite material 514 to produce an acceptable structural bond during curing.

In this illustrative example, the resin of composite material 514 will bond the resulting gas permeable composite facesheet to cellular core 524. In some other illustrative examples, an optional adhesive (not depicted) will be present between composite material 514 and cellular core 524 to bond the resulting gas permeable composite facesheet to cellular core 524. In this depicted example, the formation of the gas permeable composite facesheet and bonding of the gas permeable composite facesheet to cellular core 524 are both performed in a single manufacturing process.

When adhesive (not depicted) is present, processing may be performed on the adhesive to improve the permeability of the adhesive. For example, the adhesive may be reticulated prior to processing composite material 514. The adhesive (not depicted) may be reticulated using temperature and pressure prior to placing cellular core 524 on composite material 514. In some illustrative examples, reticulating the adhesive (not depicted) creates adhesive beads on walls of cellular core 524.

When cellular core 524 is bonded to composite material 514 during processing of composite material 514, permeability may be reduced directly under the walls of cellular core 524. The walls of cellular core 524 may block the small surface area of composite material 514 upon which the walls of cellular core 524 sit. During processing, air 515 may divert around the walls of cellular core 524.

The illustration of system 500 in FIG. 5 is not meant to imply physical or architectural limitations to the manner in which an illustrative embodiment may be implemented. Other components, in addition to or in place of the ones illustrated, may be used. Some components may be optional.

For example, cellular core 524 may have any desirable shape or thickness. In some illustrative examples, a cellular core, such as cellular core 524, may not be present, as in FIGS. 7 and 8.

Figure 6:
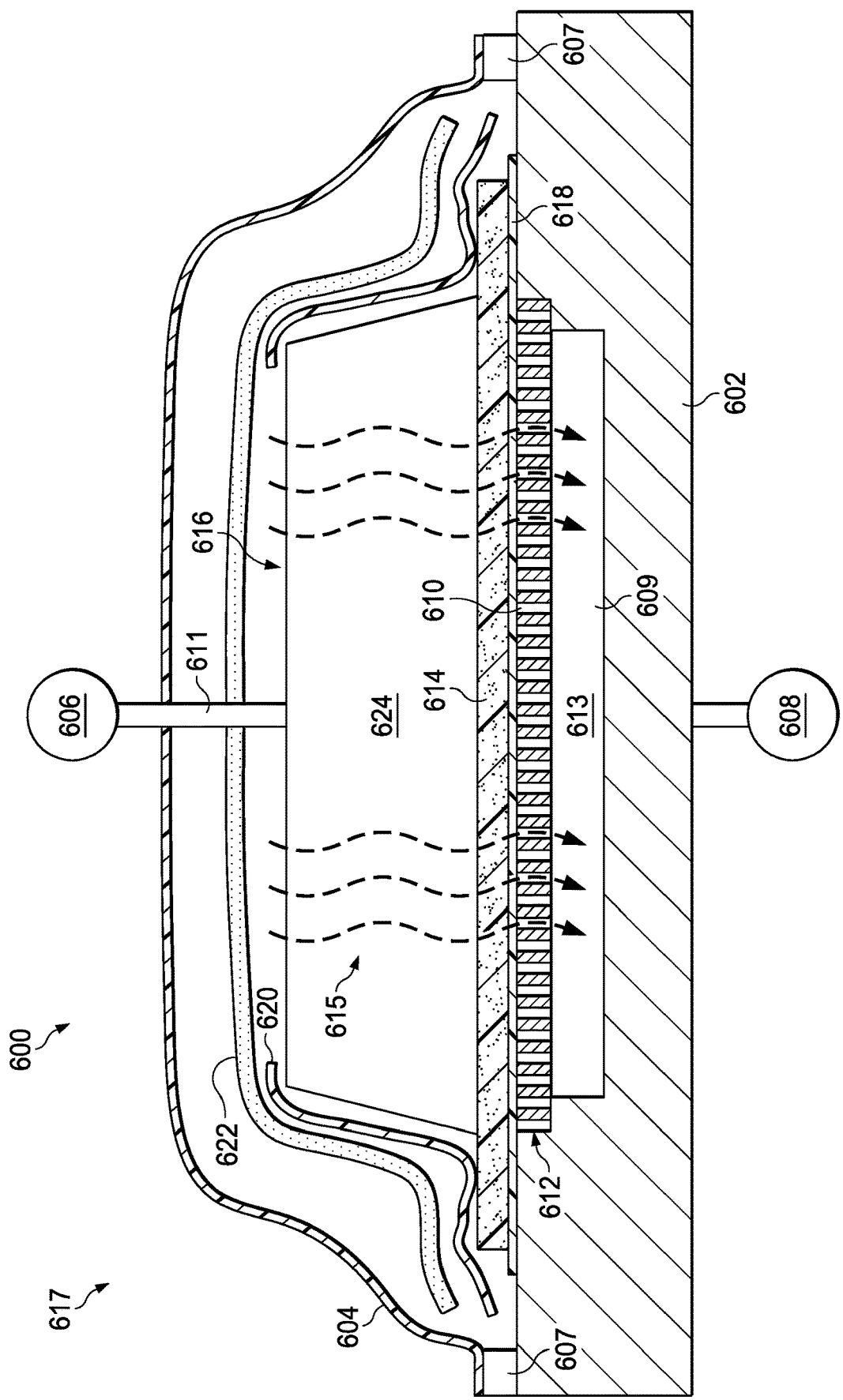
FIG. 6 is a cross-sectional view a system for forming a gas permeable composite facesheet in accordance with an illustrative embodiment.
Figure 7:
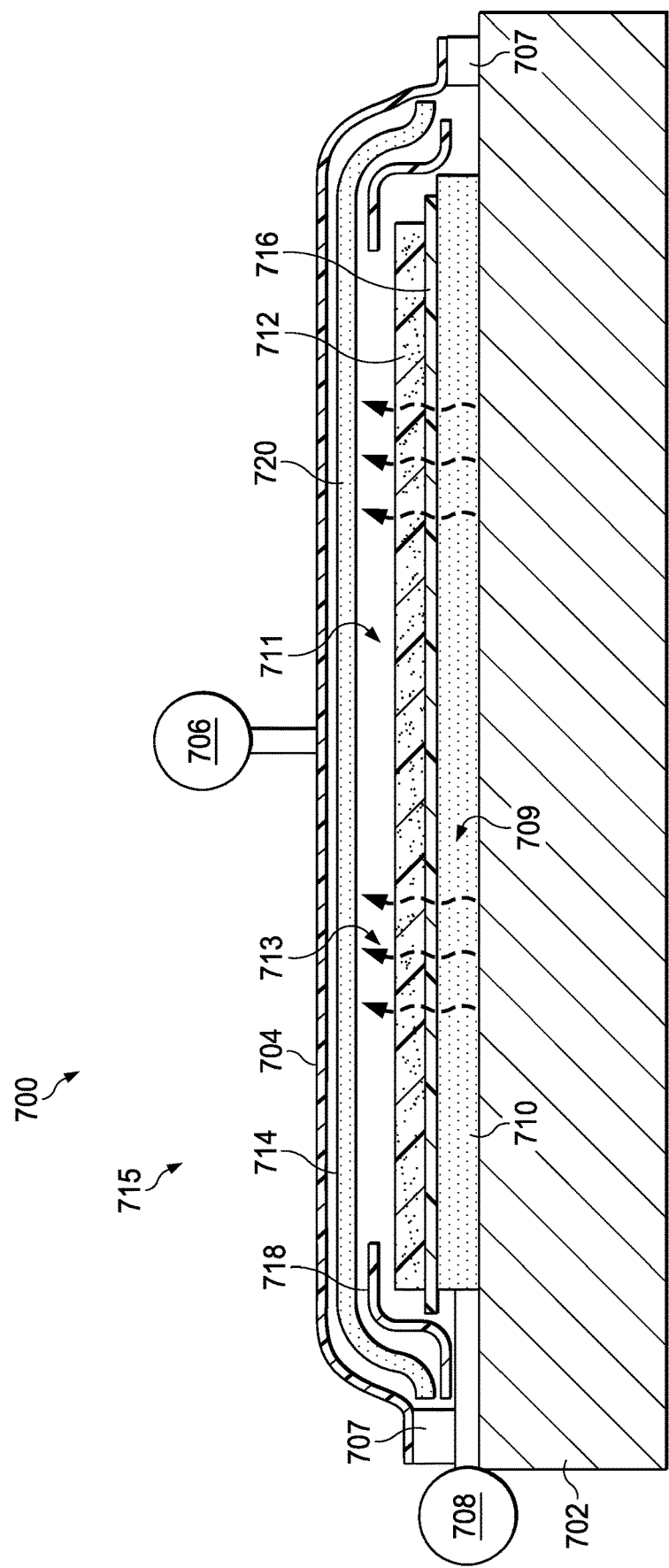
FIG. 7 is a cross-sectional view of a system for forming a gas permeable composite facesheet in accordance with an illustrative embodiment.
Figure 8:
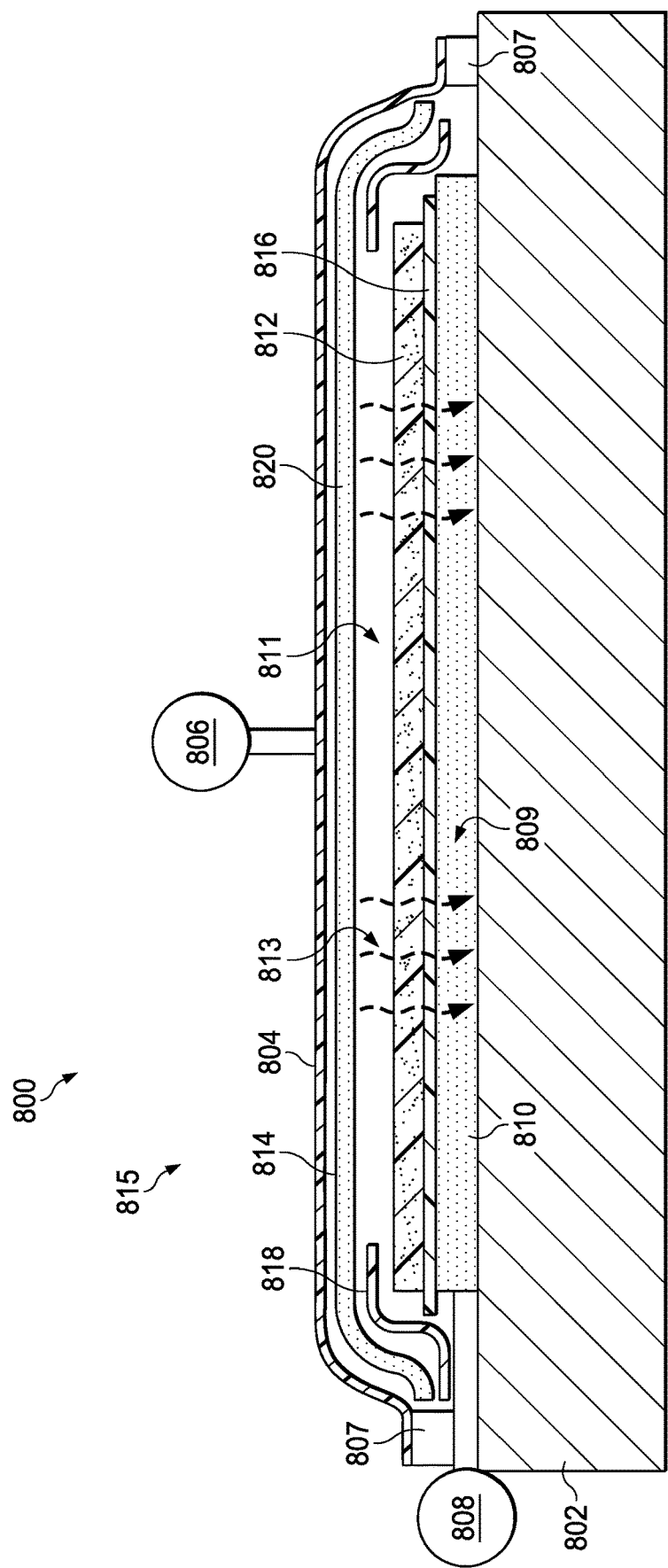
FIG. 8 is a cross-sectional view of a system for forming a gas permeable composite facesheet in accordance with an illustrative embodiment.

As another example, first pressure 509 may be less than second pressure 511, as in FIGS. 6 and 8. In some illustrative examples, first pressure 509 may be delivered in a system through processing layers such as a flow medium, as in FIGS. 7 and 8.

Although not depicted in FIG. 5 for simplicity, system 500 further includes a controller, pressure regulators, a number of pressure sources, and a plurality of sensors. The controller, the pressure regulators, the number of pressure sources, and the plurality of sensors are used to control flow of air 515. The controller, the pressure regulators, the number of pressure sources, and the plurality of sensors are used to control the permeability of the resulting gas permeable composite facesheet created from composite material 514. The controller, the pressure regulators, the number of pressure sources, and the plurality of sensors are connected, directly or indirectly, to first pressure inlet 508 and second pressure inlet 506.

Turning now to FIG. 6, a cross-sectional view of a system for forming a gas permeable composite facesheet is depicted in accordance with an illustrative embodiment. System 600 is a physical implementation of system 202 of FIG. 2. System 600 is an example of a system for forming gas permeable composite facesheet 302 of FIG. 3. System 600 is an example of a system for forming at least one of gas permeable facesheet 402 or gas permeable composite septum 406 of FIG. 4.

System 600 comprises tooling base 602, vacuum bag 604 sealed to tooling base 602, and second pressure inlet 606. Vacuum bag 604 is sealed to tooling base 602 using any desirable method. As depicted, vacuum bag 604 is sealed to tooling base 602 using sealant 607.

Tooling base 602 has first pressure inlet 608 supplying first pressure 609 to permeable tool face 610. Second pressure inlet 606 supplies second pressure 611 through vacuum bag 604. As depicted, second pressure 611 is greater than the first pressure 609.

System 600 is substantially the same as system 500 of FIG. 5, but with air 615 flowing in an opposite direction of air 515 of FIG. 5. Extra resin from curing composite material 614 may flow into tooling base 602 due to air 615 flowing towards tooling base 602. Extra resin from curing composite material 614 may flow into tooling base 602 when first pressure 609 is less than second pressure 611.

Although not depicted for simplicity, system 600 may include components to prevent extra resin from entering a vacuum source or other pressure source operatively connected to tooling base 602. Although not depicted for simplicity, when first pressure 609 is less than second pressure 611, tooling base 602 may be dismantled to remove extra resin from tooling base 602 during maintenance.

As depicted, permeable tool face 610 comprises plurality of holes 612. As depicted, chamber 613 delivers first pressure 609 from first pressure inlet 608 to plurality of holes 612. Permeable tool face 610 is configured to shape composite material 614 to form a gas permeable composite facesheet of an acoustic attenuation structure. In some illustrative examples, composite material 614 is non-planar prior to being placed on permeable tool face 610. In these illustrative examples, composite material 614 may be shaped prior to being placed on permeable tool face 610. In other illustrative examples, composite material 614 is shaped by permeable tool face 610 prior to flowing air 615 and prior to placing cellular core 624. Composite material 614 may be placed into any desirable shape or contour.

In some illustrative examples, composite material 614 is a partially impregnated composite material. When composite material 614 is a partially impregnated composite material, there may be a nominal amount of resin leaving composite material 614 during processing. When composite material 614 is a partially impregnated composite material, the level of impregnation may be tailored. The level of impregnation may be chosen based on an amount of porosity to be imposed in composite material 614. In some illustrative examples, the partially impregnated composite material has an impregnation level in the range of seventy five percent to ninety five percent. The resin content may also be tailored. In some illustrative examples, the partially impregnated composite material has resin content between twenty weight percent and forty weight percent.

When composite material 614 is fully impregnated, extra resin may flow from composite material 614 during processing. Extra resin may flow into tooling base 602 when pressure 609 is less than pressure 611.

System 600 further comprises number of processing layers 616. Number of processing layers 616 is a physical implementation of number of processing layers 252 of FIG. 2, comprising at least one of a breather or a release film. Each of number of processing layers 616 is positioned between vacuum bag 604 and tooling base 602. Each of number of processing layers 616 has a higher permeability than the gas permeable composite facesheet formed using system 600. Permeability of each component in FIG. 4 is considered in a through-thickness direction moving between tooling base 602 and vacuum bag 604.

By having a higher permeability than the permeable facesheet formed from curing composite material 614, number of processing layers 616 does not impede air 615 flowing through composite material 614. By number of processing layers 616 having a higher permeability than the permeable facesheet formed from curing composite material 614, composite material 614 becomes the rate limiting layer for the flow of air 615 between first pressure 609 and second pressure 611.

As depicted, system 600 is processed at pressure 617. Pressure 617 is the pressure within an oven or an autoclave containing system 600 as composite material 614 is cured. Pressure 617 is greater than both first pressure 609 and second pressure 611. Pressure 617 stops vacuum bag 604 from inflating.

In this illustrative example, number of processing layers 616 comprises release film 618, release film 620, and breather 622. Release film 618 desirably prevents resin from composite material 614 from entering plurality of holes 612. Release film 618 also desirably does not present a barrier to first pressure 609 passing through to composite material 614. Release film 618 is formed of any desirable material that has a higher permeability than the resulting gas permeable composite facesheet.

In this illustrative example, cellular core 624 sits on composite material 614. Pressure 617 holds cellular core 624 against composite material 614 to produce an acceptable structural bond during curing.

In this illustrative example, the resin of composite material 614 will bond the resulting gas permeable composite facesheet to cellular core 624. In some other illustrative examples, an optional adhesive (not depicted) will be present between composite material 614 and cellular core 624 to bond the resulting gas permeable composite facesheet to cellular core 624. In this depicted example, the formation of the gas permeable composite facesheet and bonding of the gas permeable composite facesheet to cellular core 624 are both performed in a single manufacturing process.

When adhesive (not depicted) is present, processing may be performed on the adhesive to improve the permeability of the adhesive. For example, the adhesive may be reticulated prior to processing composite material 614. The adhesive (not depicted) may be reticulated using temperature and pressure prior to placing cellular core 624 on composite material 614. In some illustrative examples, reticulating the adhesive (not depicted) creates adhesive beads on walls of cellular core 624.

When cellular core 624 is bonded to composite material 614 during processing of composite material 614, permeability may be reduced directly under the walls of cellular core 624. The walls of cellular core 624 may block the small surface area of composite material 614 upon which the walls of cellular core 624 sit. During processing, air 615 may divert around the walls of cellular core 624.

Although not depicted in FIG. 6 for simplicity, system 600 further includes a controller, pressure regulators, a number of pressure sources, and a plurality of sensors. The controller, the pressure regulators, the number of pressure sources, and the plurality of sensors are used to control flow of air 615. The controller, the pressure regulators, the number of pressure sources, and the plurality of sensors are used to control the permeability of the resulting gas permeable composite facesheet created from composite material 614. The controller, the pressure regulators, the number of pressure sources, and the plurality of sensors are connected, directly or indirectly, to first pressure inlet 608 and second pressure inlet 606.

Turning now to FIG. 7, a cross-sectional view of a system for forming a gas permeable composite facesheet is depicted in accordance with an illustrative embodiment. System 700 is a physical implementation of system 202 of FIG. 2. System 700 is an example of a system for forming gas permeable composite facesheet 302 of FIG. 3. System 700 is an example of a system for forming at least one of gas permeable composite facesheet 402 or gas permeable composite septum 406 of FIG. 4.

System 700 comprises tooling base 702, vacuum bag 704 sealed to tooling base 702, and second pressure inlet 706. Vacuum bag 704 is sealed to tooling base 702 using any desirable method. As depicted, vacuum bag 704 is sealed to tooling base 702 using sealant 707.

First pressure inlet 708 supplies first pressure 709 to flow media 710 sitting on tooling base 702. Second pressure inlet 706 supplies second pressure 711 through vacuum bag 704. Second pressure 711 is less than first pressure 709.

As depicted, tooling base 702 is impermeable to air. First pressure 709 is delivered through flow media 710 to composite material 712.

System 700 comprises number of processing layers 714. Number of processing layers 714 is a physical implementation of number of processing layers 252 of FIG. 2 comprising at least one of a breather or a release film. Each of number of processing layers 714 has a higher permeability than the gas permeable composite facesheet formed using system 700. Permeability of each component in FIG. 7 is considered in a through-thickness direction moving between tooling base 702 and vacuum bag 704.

By having a higher permeability than the permeable facesheet formed from curing composite material 712, number of processing layers 714 does not impede air 713 flowing through composite material 712. By number of processing layers 714 having a higher permeability than the permeable facesheet formed from curing composite material 712, composite material 712 becomes the rate limiting layer for the flow of air 713 between first pressure 709 and second pressure 711.

As depicted, system 700 is processed at pressure 715. Pressure 715 is the pressure within an oven or an autoclave containing system 700 as composite material 712 is cured. Pressure 715 is greater than both first pressure 709 and second pressure 711. Pressure 715 stops vacuum bag 704 from inflating. Pressure 715 also holds composite material 712 against release film 716, flow media 710, and tooling base 702. Pressure 715 applies a force to stop composite material 712 from lifting away from tooling base 702.

In this illustrative example, number of processing layers 714 comprises flow media 710, release film 716, release film 718, and breather 720. Release film 716 desirably prevents resin from composite material 712 from entering flow media 710. Release film 716 also desirably does not present a barrier to the first pressure passing through to composite material 712. Release film 716 is formed of any desirable material that has a higher permeability than the resulting gas permeable composite facesheet.

In this illustrative example, a cellular core is not present within system 700. When the resulting gas permeable composite facesheet is used in an acoustic attenuation structure, such as acoustic attenuation structure 300 of FIG. 3, the resulting gas permeable composite facesheet will be bonded to a cellular core with adhesive. The formation of the gas permeable composite facesheet and bonding of the gas permeable composite facesheet to cellular core will be performed in separate manufacturing processes.

Processing may be performed on the adhesive to improve the permeability of the adhesive prior to placing a cellular core with the adhesive onto the resulting gas permeable composite facesheet. For example, optional adhesive 319 is present when forming gas permeable composite facesheet 302 and joining to cellular core 304 are performed in separate steps. In this illustrative example, optional adhesive 319 may be reticulated prior to placing cellular core 304 onto gas permeable composite facesheet 302 of FIG. 3. In some illustrative examples, reticulating the adhesive, such as optional adhesive 319, creates adhesive beads on walls of a cellular core, such as cellular core 304.

A resulting gas permeable composite facesheet may be used in products other than an acoustic attenuation structure. The resulting gas permeable composite facesheet may be used in any product that would benefit from a gas permeable layer. In one illustrative example, the resulting gas permeable composite facesheet may be used in a septum.

Although the resulting product is referred to as a gas permeable composite facesheet, the product may be any permeable composite product. In some illustrative examples, the product may instead be referred to as a gas permeable composite septum, such as gas permeable composite septum 406.

Although not depicted in FIG. 7 for simplicity, system 700 further includes a controller, pressure regulators, a number of pressure sources, and a plurality of sensors. The controller, the pressure regulators, the number of pressure sources, and the plurality of sensors are used to control flow of air 713. The controller, the pressure regulators, the number of pressure sources, and the plurality of sensors are used to control the permeability of the resulting gas permeable composite facesheet created from composite material 712. The controller, the pressure regulators, the number of pressure sources, and the plurality of sensors are connected, directly or indirectly, to first pressure inlet 708 and second pressure inlet 706.

Turning now to FIG. 8, a cross-sectional view of a system for forming a gas permeable composite facesheet is depicted in accordance with an illustrative embodiment. System 800 is a physical implementation of system 202 of FIG. 2. System 800 is an example of a system for forming gas permeable composite facesheet 302 of FIG. 3. System 800 is an example of a system for forming at least one of gas permeable composite facesheet 402 or gas permeable composite septum 406 of FIG. 4.

System 800 comprises tooling base 802, vacuum bag 804 sealed to tooling base 802, and second pressure inlet 806. Vacuum bag 804 is sealed to tooling base 802 using any desirable method. As depicted, vacuum bag 804 is sealed to tooling base 802 using sealant 807.

First pressure inlet 808 supplies first pressure 809 to flow media 810 sitting on tooling base 802. Second pressure inlet 806 supplies second pressure 811 through vacuum bag 804. As depicted, second pressure 811 is greater than first pressure 809.

System 800 is substantially the same as system 700 of FIG. 7, but with air 813 flowing in an opposite direction of air 713 of FIG. 7. Extra resin from curing composite material 812 may flow into tooling base 802 due to air 813 flowing towards tooling base 802. Extra resin from curing composite material 812 may flow into tooling base 802 when first pressure 809 is less than second pressure 811.

Although not depicted for simplicity, system 800 may include components to prevent extra resin from entering a vacuum source or other pressure source operatively connected to tooling base 802. Although not depicted for simplicity, when first pressure 809 is less than second pressure 811, tooling base 802 may be dismantled to remove extra resin from tooling base 802 during maintenance.

As depicted, tooling base 802 is impermeable to air. First pressure 809 is delivered through flow media 810 to composite material 812.

System 800 comprises number of processing layers 814. Number of processing layers 814 is a physical implementation of number of processing layers 252 of FIG. 2 comprising at least one of a breather or a release film. Each of number of processing layers 814 has a higher permeability than the gas permeable composite facesheet formed using system 800. Permeability of each component in FIG. 8 is considered in a through-thickness direction moving between tooling base 802 and vacuum bag 804.

By having a higher permeability than the permeable facesheet formed from curing composite material 812, number of processing layers 814 does not impede the air flowing through composite material 812. By number of processing layers 814 having a higher permeability than the permeable facesheet formed from curing composite material 812, composite material 812 becomes the rate limiting layer for air flow between first pressure 809 and second pressure 811.

As depicted, system 800 is processed at pressure 815. Pressure 815 is the pressure within an oven or an autoclave containing system 800 as composite material 812 is cured. Pressure 815 is greater than both first pressure 809 and second pressure 811. Pressure 815 holds composite material 812 against release film 816, flow media 810, and tooling base 802.

In this illustrative example, number of processing layers 814 comprises flow media 810, release film 816, release film 818, and breather 820. Release film 816 desirably prevents resin from composite material 812 from entering flow media 810. Release film 816 also desirably does not present a barrier to the first pressure passing through to composite material 812. Release film 816 is formed of any desirable material that has a higher permeability than the resulting gas permeable composite facesheet.

In this illustrative example, a cellular core is not present within system 800. When the resulting gas permeable composite facesheet is used in an acoustic attenuation structure, such as acoustic attenuation structure 300 of FIG. 3, the resulting gas permeable composite facesheet will be bonded to a cellular core with adhesive. The formation of the gas permeable composite facesheet and bonding of the gas permeable composite facesheet to cellular core will be performed in separate manufacturing processes.

Processing may be performed on the adhesive to improve the permeability of the adhesive prior to placing a cellular core with the adhesive onto the resulting gas permeable composite facesheet. For example, optional adhesive 319 is present when forming gas permeable composite facesheet 302 and joining to cellular core 304 are performed in separate steps. In this illustrative example, optional adhesive 319 may be reticulated prior to placing cellular core 304 onto gas permeable composite facesheet 302 of FIG. 3. In some illustrative examples, reticulating the adhesive, such as optional adhesive 319, creates adhesive beads on walls of a cellular core, such as cellular core 304.

A resulting gas permeable composite facesheet may be used in products other than an acoustic attenuation structure. The resulting gas permeable composite facesheet may be used in any product that would benefit from a gas permeable layer. In one illustrative example, the resulting gas permeable composite facesheet may be used in a septum.

Although the resulting product is referred to as a gas permeable composite facesheet, the product may be any permeable composite product. In some illustrative examples, the product may instead be referred to as a gas permeable composite septum, such as gas permeable composite septum 406.

Although not depicted in FIG. 8 for simplicity, system 800 further includes a controller, pressure regulators, a number of pressure sources, and a plurality of sensors. The controller, the pressure regulators, the number of pressure sources, and the plurality of sensors are used to control flow of air 813. The controller, the pressure regulators, the number of pressure sources, and the plurality of sensors are used to control the permeability of the resulting gas permeable composite facesheet created from composite material 812. The controller, the pressure regulators, the number of pressure sources, and the plurality of sensors are connected, directly or indirectly, to first pressure inlet 808 and second pressure inlet 806.

The different components shown in FIG. 1 and FIGS. 5-8 may be combined with components in FIGS. 2-4, used with components in FIGS. 2-4, or a combination of the two. Additionally, some of the components in FIG. 1 and FIGS. 5-8 may be illustrative examples of how components shown in block form in FIGS. 2-4 may be implemented as physical structures.

Figure 9:
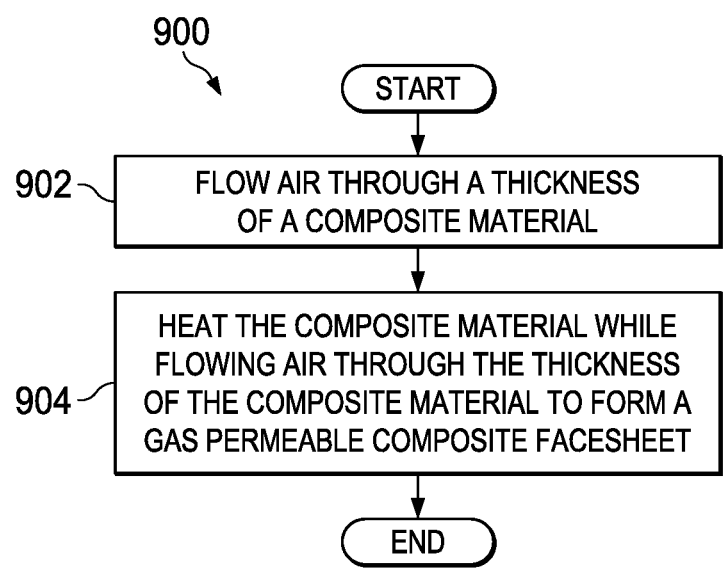
FIG. 9 is an illustration of a flowchart of a method for forming a gas permeable composite facesheet of an acoustic attenuation structure in accordance with an illustrative embodiment.

Turning now to FIG. 9, an illustration of a flowchart of a method for forming a gas permeable composite facesheet of an acoustic attenuation structure is depicted in accordance with an illustrative embodiment. Method 900 may be used in manufacturing environment 200 to using system 202 and composite material 235 of FIG. 2. Method 900 may form gas permeable composite facesheet 302 of FIG. 3. Method 900 may form at least one of gas permeable composite facesheet 402 or gas permeable composite septum 406 of FIG. 4. Method 900 may be performed in system 500 of FIG. 5, system 600 of FIG. 6, system 700 of FIG. 7, or system 800 of FIG. 8.

Method 900 flows air through a thickness of a composite material (operation 902). In some illustrative examples, the partially impregnated composite material has an impregnation level in the range of seventy five percent to ninety five percent and a resin content between twenty weight percent and forty weight percent. In some illustrative examples, the resin of the composite material has a minimum resin viscosity during cure in the range of 1 to 1000 Poise.

Method 900 heats the composite material while flowing air through the thickness of the composite material to form a gas permeable composite facesheet (operation 904). Afterwards, the method terminates.

In some illustrative examples, temperature sensors are used to monitor the temperature of the composite material during heating. When composite the material is a thermoset, the temperature sensors may be used during the curing process.

Forming a gas permeable composite facesheet using method 900 presents advantages over conventional manufacturing of perforated composites. In some illustrative examples, an aerodynamic drag of the gas permeable composite facesheet is less than a composite facesheet with perforations having a same permeability as the gas permeable composite facesheet. Gas permeable composite facesheet is substantially smooth, in contrast to a composite facesheet with perforations. Perforations are large visible holes. Gas permeable composite facesheet has reduced friction by having no perforations. Reduced friction reduces the aerodynamic drag.

Method 900 may reduce at least one of manufacturing time or manufacturing cost. Method 900 is repeatable and controllable to create a desired permeability. A gas permeable composite facesheet manufactured using method 900 may be qualified using sensor measurements taken during method 900.

Figure 10A:
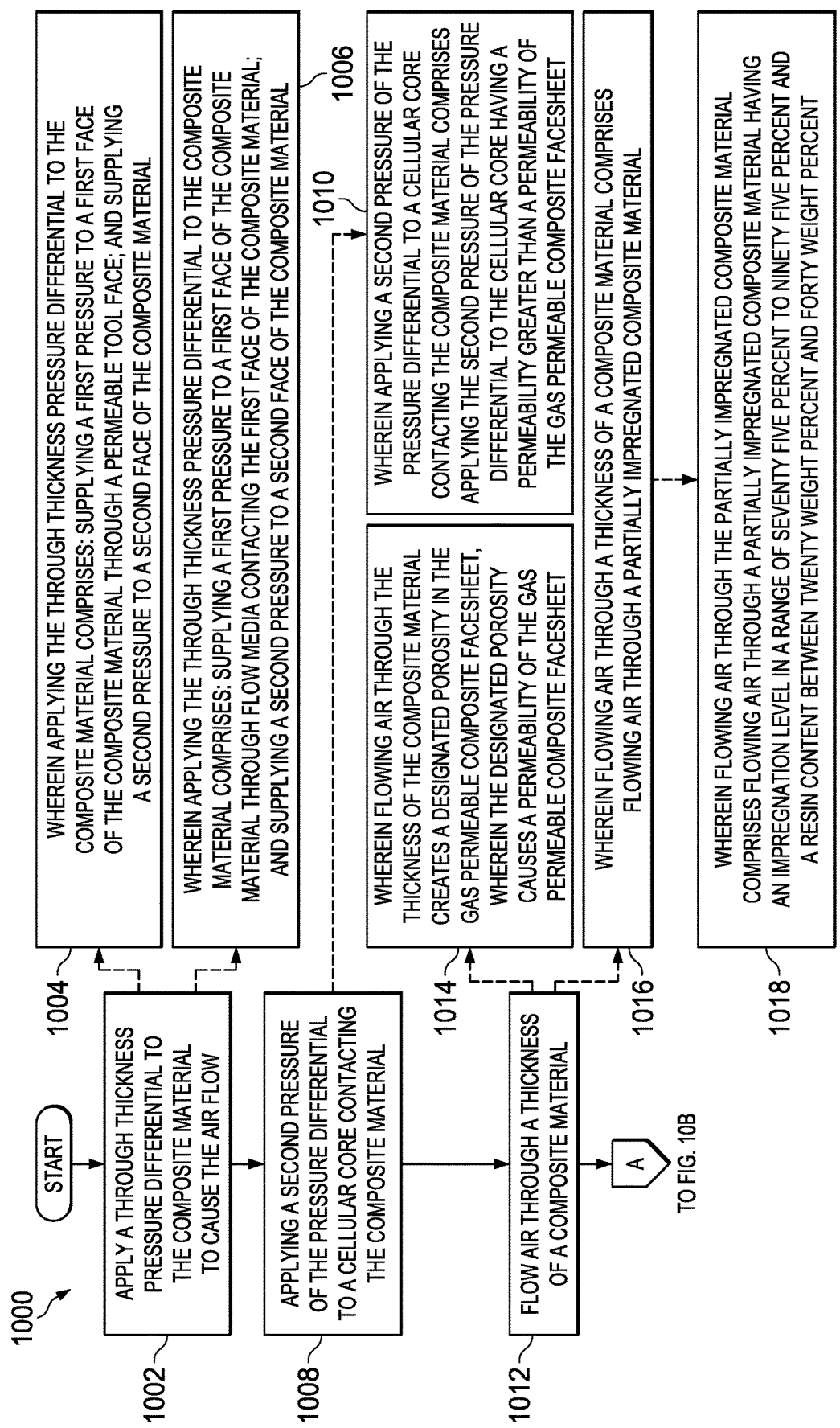
FIGS. 10A and 10B are an illustration of a flowchart of a method for forming a gas permeable composite facesheet of an acoustic attenuation structure in accordance with an illustrative embodiment.
Figure 10B:
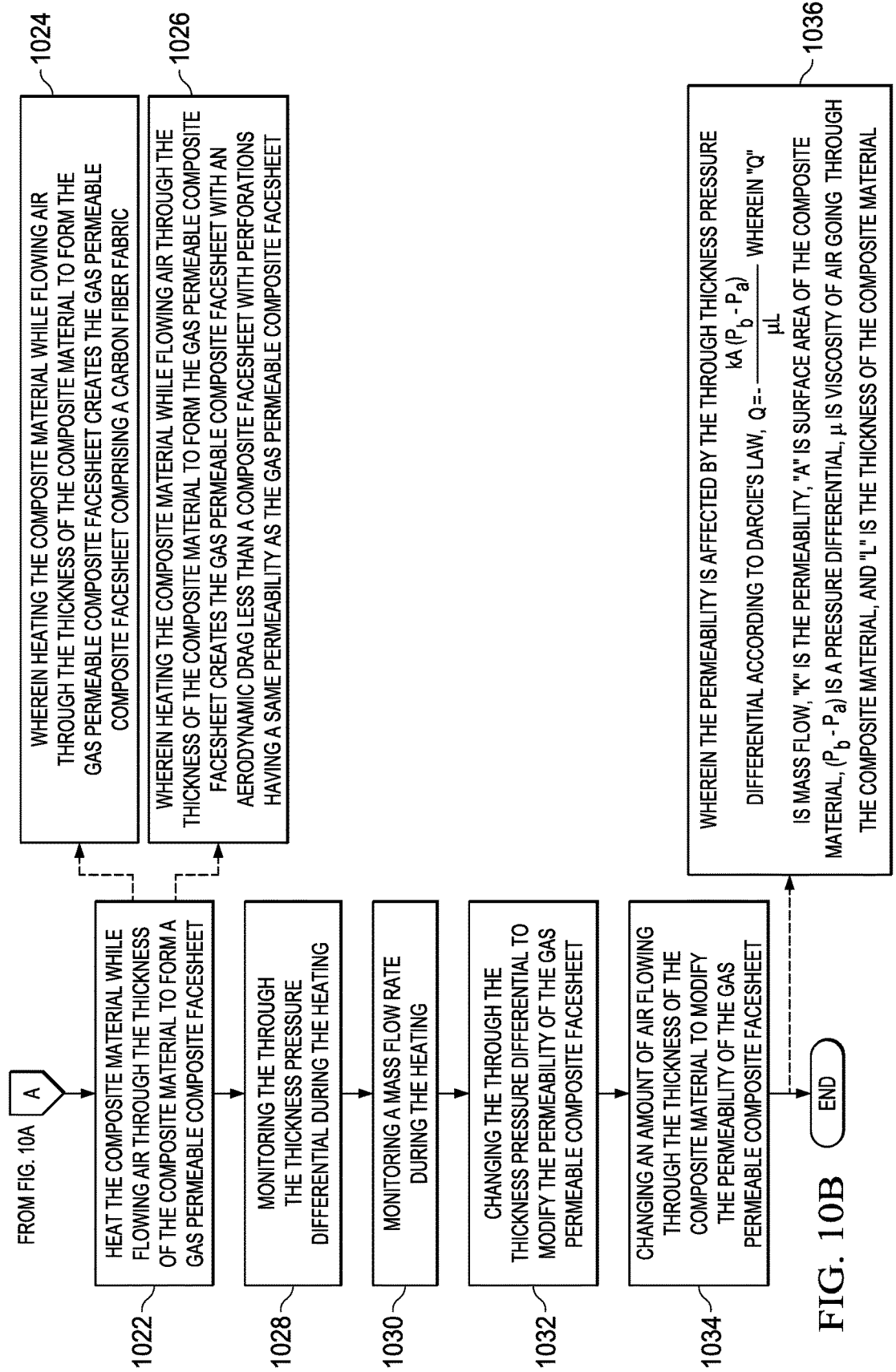

Turning now to FIGS. 10A and 10B, an illustration of a flowchart of a method for forming a gas permeable composite facesheet of an acoustic attenuation structure is depicted in accordance with an illustrative embodiment. Method 1000 may be used in manufacturing environment 200 to using system 202 and composite material 235 of FIG. 2. Method 1000 may form gas permeable composite facesheet 302 of FIG. 3. Method 1000 may form at least one of gas permeable composite facesheet 402 or gas permeable composite septum 406 of FIG. 4. Method 1000 may be performed in system 500 of FIG. 5, system 600 of FIG. 6, system 700 of FIG. 7, or system 800 of FIG. 8.

Method 1000 applies a through thickness pressure differential to the composite material to cause the air flow (operation 1002). In some illustrative examples of method 1000, applying the through thickness pressure differential to the composite material comprises: supplying a first pressure to a first face of the composite material through a permeable tool face; and supplying a second pressure to a second face of the composite material (operation 1004). In some illustrative examples, the first pressure is greater than the second pressure. In other illustrative examples, the second pressure is greater than the first pressure. In all illustrative examples, the air flow is from the greater pressure of the pressure differential to the lesser pressure of the pressure differential.

In some illustrative examples of method 1000, applying the through thickness pressure differential to the composite material comprises: supplying a first pressure to a first face of the composite material through flow media contacting the first face of the composite material; and supplying a second pressure to a second face of the composite material (operation 1006). In some illustrative examples, the first pressure is greater than the second pressure. In other illustrative examples, the second pressure is greater than the first pressure.

Method 1000 applies a second pressure of the pressure differential to a cellular core contacting the composite material (operation 1008). In some illustrative examples of method 1000, applying a second pressure of the pressure differential to a cellular core contacting the composite material comprises applying the second pressure of the pressure differential to the cellular core having a permeability greater than a permeability of the gas permeable composite facesheet (operation 1010).

Method 1000 flows air through a thickness of the composite material (operation 1012). In some illustrative examples of method 1000, flowing air through the thickness of the composite material creates a designated porosity in the gas permeable composite facesheet, wherein the designated porosity causes a permeability of the gas permeable composite facesheet (operation 1014). In some illustrative examples of method 1000, flowing air through a thickness of a composite material comprises flowing air through a partially impregnated composite material (operation 1016). In some illustrative examples of method 1000, flowing air through the partially impregnated composite material comprises flowing air through a partially impregnated composite material having an impregnation level in a range of seventy five percent to ninety five percent and a resin content between twenty weight percent and forty weight percent (operation 1018).

Method 1000 heats the composite material while flowing air through the thickness of the composite material to form a gas permeable composite facesheet (operation 1022). In some illustrative examples, temperature sensors are used to monitor the temperature of the composite material during heating. When composite the material is a thermoset, the temperature sensors may be used during the curing process.

In some illustrative examples, the composite material is a thermoset composite material and this heating step may be a curing step. In some illustrative examples, the composite material is a thermoplastic composite material and this heating step is a portion of a controlled temperature sequence for consolidating the thermoplastic composite material. In some illustrative examples of method 1000, heating the composite material while flowing air through the thickness of the composite material to form the gas permeable composite facesheet creates the gas permeable composite facesheet comprising a carbon fiber fabric. (operation 1024). In some illustrative examples, heating the composite material while flowing air through its thickness to form the gas permeable composite facesheet creates the gas permeable composite facesheet with an aerodynamic drag less than a composite facesheet with perforations having a same permeability as the gas permeable composite facesheet (operation 1026).

Method 1000 monitors the through the thickness pressure differential during the heating (operation 1028). Method 1000 monitors a mass flow rate during the heating (operation 1030). Method 1000 changes the through the thickness pressure differential to modify the permeability of the gas permeable composite facesheet (operation 1032). Method 1000 changes an amount of air flowing through the thickness of the composite material to modify the permeability of the gas permeable composite facesheet (operation 1034). In some illustrative examples of method 1000, the permeability is affected by the through thickness pressure differential according to Darcie's Law, $$Q = -\frac{kA(p_b - p_a)}{\mu L},$$

wherein "Q" is mass flow rate, "k" is the permeability, "A" is surface area of the composite material, ($p_b$-$p_a$) is a through thickness pressure differential, $\mu$ is viscosity of air going through the composite material, and "L" is the thickness of the composite material (operation 1036).

Figure 11:
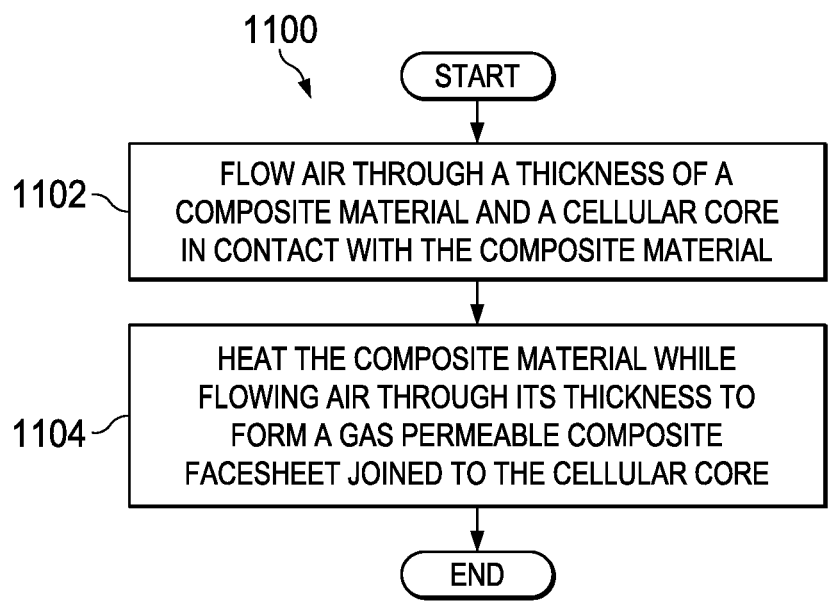
FIG. 11 is an illustration of a flowchart of a method for forming a gas permeable composite facesheet joined to a cellular core in accordance with an illustrative embodiment.

Turning now to FIG. 11, an illustration of a flowchart of a method for forming a gas permeable composite facesheet joined to a cellular core is depicted in accordance with an illustrative embodiment. Method 1100 may be used in manufacturing environment 200 to using system 202 and composite material 235 of FIG. 2. Method 1100 may form gas permeable composite facesheet 302 of FIG. 3. Method 1100 may form at least one of gas permeable composite facesheet 402 or gas permeable composite septum 406 of FIG. 4. Method 900 may be performed in system 500 of FIG. 5, system 600 of FIG. 6, system 700 of FIG. 7, or system 800 of FIG. 8.

Method 1100 flows air through a thickness of a composite material and a cellular core in contact with the composite material (operation 1102). Method 1100 heats the composite material while flowing air through its thickness to form a gas permeable composite facesheet joined to the cellular core (operation 1104). Afterwards, the process terminates.

In some illustrative examples, temperature sensors are used to monitor the temperature of the composite material during heating. When composite the material is a thermoset, the temperature sensors may be used during the curing process.

Figure 12:
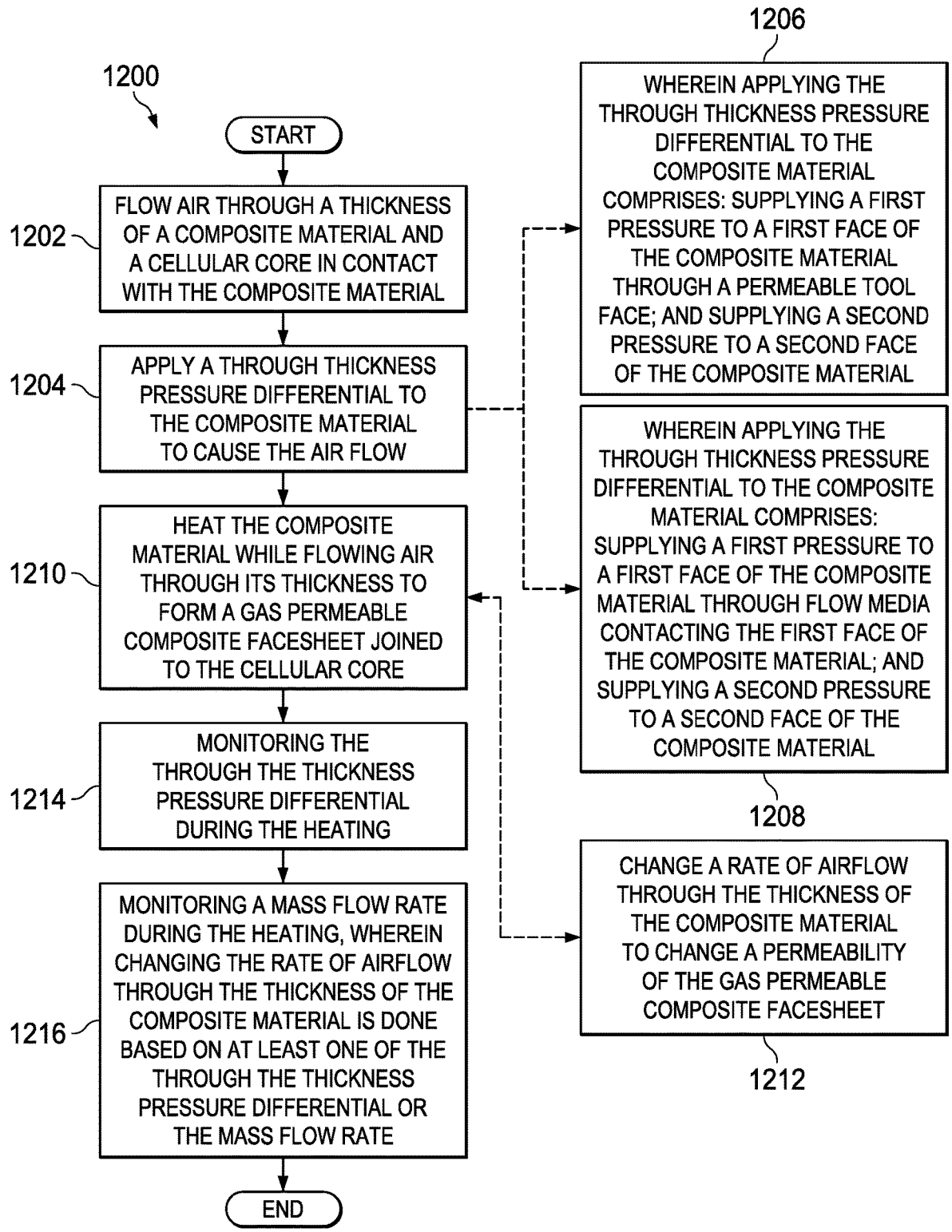
FIG. 12 is an illustration of a flowchart of a method for forming a gas permeable composite facesheet joined to a cellular core in accordance with an illustrative embodiment.

Turning now to FIG. 12, an illustration of a flowchart of a method for forming a gas permeable composite facesheet joined to a cellular core is depicted in accordance with an illustrative embodiment. Method 1200 may be used in manufacturing environment 200 to using system 202 and composite material 235 of FIG. 2. Method 1200 may form gas permeable composite facesheet 302 of FIG. 3. Method 1200 may form at least one of gas permeable composite facesheet 402 or gas permeable composite septum 406 of FIG. 4. Method 900 may be performed in system 500 of FIG. 5, system 600 of FIG. 6, system 700 of FIG. 7, or system 800 of FIG. 8.

Method 1200 flows air through a thickness of a composite material and a cellular core in contact with the composite material (operation 1202). Method 1200 applies a through thickness pressure differential to the composite material to cause the air flow (operation 1204). In some illustrative examples, applying the through thickness pressure differential to the composite material comprises: supplying a first pressure to a first face of the composite material through a permeable tool face; and supplying a second pressure to a second face of the composite material (operation 1206). In some illustrative examples, the first pressure is greater than the second pressure.

In some illustrative examples, applying the through thickness pressure differential to the composite material comprises: supplying a first pressure to a first face of the composite material through flow media contacting the first face of the composite material; and supplying a second pressure to a second face of the composite material (operation 1208). In some illustrative examples, the first pressure is greater than the second pressure. In some illustrative examples, the second pressure is greater than the first pressure.

Method 1200 heats the composite material while flowing air through its thickness to form a gas permeable composite facesheet joined to the cellular core (operation 1210). In some illustrative examples, temperature sensors are used to monitor the temperature of the composite material during heating. When composite the material is a thermoset, the temperature sensors may be used during the curing process.

In some illustrative examples, method 1200 changes a rate of air flow through the thickness of the composite material to change a permeability of the gas permeable composite facesheet (operation 1212). Method 1200 monitors a through the thickness pressure differential during the heating (operation 1214). Method 1200 monitors a mass flow rate during the heating, wherein changing the rate of air flow through the thickness of the composite material is done based on at least one of the through the thickness pressure differential or the mass flow rate (operation 1216).

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram. In some illustrative examples, some blocks may be removed or may be optional.

In some illustrative examples, method 900 further comprises applying a through thickness pressure differential to the composite material to cause air flow. In some illustrative examples, method 900 further comprises applying the through thickness pressure differential to a cellular core contacting the composite material. In these illustrative examples, the cellular core has a permeability greater than the permeability of the gas permeable composite facesheet.

In some illustrative examples, method 900 further comprises monitoring the through the thickness pressure differential during the heating, monitoring the mass flow rate during the heating, and changing the through the thickness pressure differential to modify the permeability of the gas permeable composite facesheet.

In some illustrative examples, applying the through thickness pressure differential to the composite material comprises supplying a first pressure to a first face of the composite material through a permeable tool face, and supplying a second pressure to a second face of the composite material, wherein the first pressure is greater than the second pressure. In some illustrative examples, applying the through thickness pressure differential to the composite material comprises supplying a first pressure to a first face of the composite material through flow media contacting the first face of the composite material, and supplying a second pressure to a second face of the composite material, wherein the first pressure is greater than the second pressure.

The permeability is affected by the through thickness pressure differential according to Darcie's Law, wherein $$Q = -\frac{kA(p_b - p_a)}{\mu L},$$

"Q" is mass flow rate, "k" is the permeability, "A" is surface area of the composite material, $(p_b - p_a)$ is the through thickness pressure differential, $\mu$ is a viscosity of air going through the composite material, and "L" is a thickness of the composite material.

In some illustrative examples, method 900 further comprises monitoring a mass flow rate during the heating, and changing an amount of air flowing through the thickness to modify the permeability of the gas permeable composite facesheet. In some illustrative examples, the amount of air is changed by changing a pressure applied to the system.

In some illustrative examples, method 1100 changes a rate of air flow through the thickness of the composite material to change a permeability of the gas permeable composite facesheet. Method 1100 monitors a through the thickness pressure differential during the heating; and monitors a mass flow rate during the heating, wherein changing the rate of air flow through the thickness of the composite material is done based on at least one of the through the thickness pressure differential or the mass flow rate. Method 1100 applies a through thickness pressure differential to the composite material to cause the air flow. In some illustrative examples, applying the through thickness pressure differential to the composite material comprises: supplying a first pressure to a first face of the composite material through a permeable tool face; and supplying a second pressure to a second face of the composite material. In some illustrative examples, the first pressure is greater than the second pressure.

In some illustrative examples, applying the through thickness pressure differential to the composite material comprises: supplying a first pressure to a first face of the composite material through flow media contacting the first face of the composite material; and supplying a second pressure to a second face of the composite material. In some illustrative examples, the first pressure is greater than the second pressure. In some illustrative examples, the second pressure is greater than the first pressure.

Figure 13:
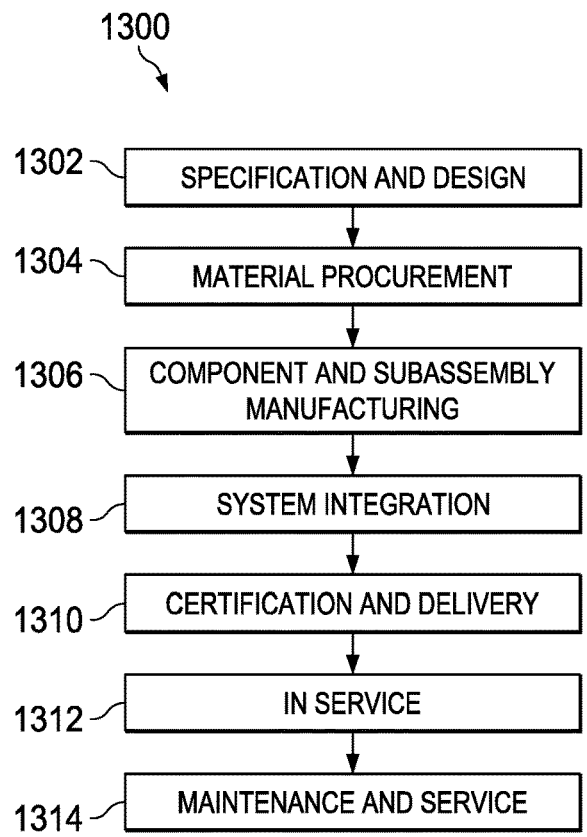
FIG. 13 is an illustration of an aircraft manufacturing and service method in a form of a block diagram in accordance with an illustrative embodiment.
Figure 14:
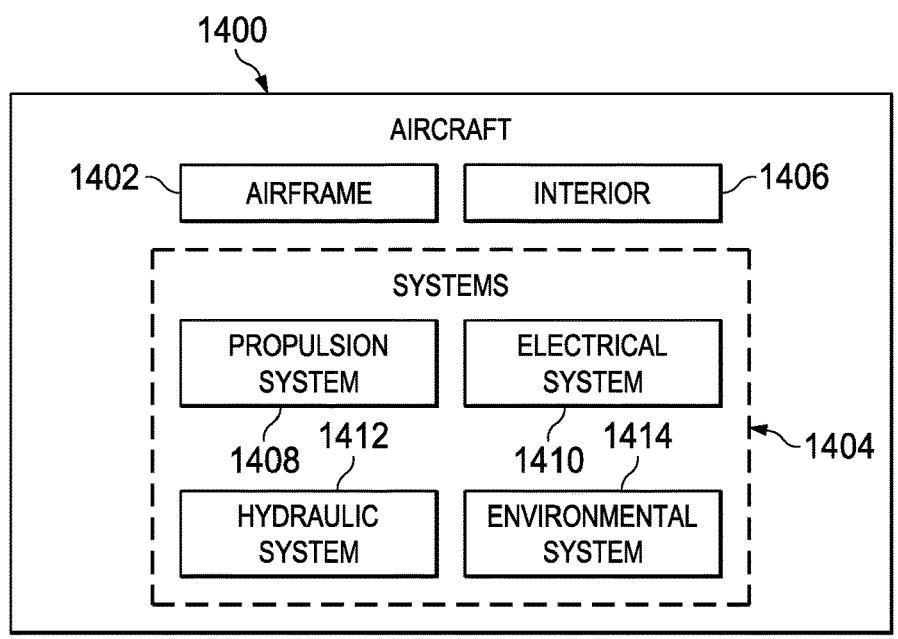
FIG. 14 is an illustration of an aircraft in the form of a block diagram in which an illustrative embodiment may be implemented.

Illustrative embodiments of the present disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 takes place. Thereafter, aircraft 1400 may go through certification and delivery 1310 in order to be placed in service 1312. While in service 1312 by a customer, aircraft 1400 is scheduled for routine maintenance and service 1314, which may include modification, reconfiguration, refurbishment, or other maintenance and service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an illustrative embodiment may be implemented. In this example, aircraft 1400 is produced by aircraft manufacturing and service method 1300 of FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300. As used herein, the phrase "at least one of," when used with a list of items, means different combinations of one or more of the listed items may be used, and only one of each item in the list may be needed. In or words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combination of these items may be present. In other examples, "at least one of" may be, for example, without limitation, two of item A, one of item B, and ten of item C; four of item B and seven of item C; or other suitable combinations.

One or more illustrative embodiments may be used during at least one of component and subassembly manufacturing 1306, system integration 1308, or maintenance and service 1314 of FIG. 13. For example, system 202 of FIG. 2 may be used during component and subassembly manufacturing 1306 to heat and process composite material 235 of FIG. 2. Gas permeable composite facesheet 302 of FIG. 3 may be formed during component and subassembly manufacturing 1306 using method 900 of FIG. 9, method 1000 of FIGS. 10A and 10B, method 1100 of FIG. 11, or method 1200 of FIG. 12. Acoustic attenuation structure 300 including gas permeable composite facesheet 302 may be connected to aircraft 1400 during system integration 1308. System 202 of FIG. 2 may be used to form replacement components used during maintenance and service 1314 of FIG. 13.

Acoustic attenuation structure 300 of FIG. 3 may be used to attenuate sound generated by propulsion system 1408. In some illustrative examples, acoustic attenuation structure 300 of FIG. 3 may be used to attenuate sound generated within interior 1406. Acoustic attenuation structure 300 of FIG. 3 may be attached to airframe 1402 to attenuate sound by any of systems 1404.

The illustrative examples present an acoustic attenuation panel having a gas permeable composite facesheet. The gas permeable composite facesheet is formed by continuously flowing air through a composite material during heating.

A partially impregnated prepreg with dry fiber in the center has a resin with little flow (high min viscosity during curing for a thermoset). These material features may be used to design a controlled amount of open porosity into the fabric laminate, or gas permeable composite facesheet.

In one illustrative example, to achieve the controlled amount of open porosity, a vacuum pressure differential will be created in the through thickness direction of the laminate ensuring air is always flowing through the facesheet during heating and processing, such as curing.

Using differential pressure across a porous fabric during the processing, such as curing or consolidating, allows for direct control and monitoring during fabrication of key acoustic performance parameters. In some illustrative examples, the permeability would be controlled by using inline mass flow/pressure sensors. One example of commercially available mass flow/pressure sensors is in the COHO system from Convergent Manufacturing Technologies, Inc. These flow sensors allow for the direct measurement of gas permeability during the heating process. The sensors also allow for vacuum bag leak detection. Using differential pressure across the porous fabric during the heating process may also reduce manufacturing costs for acoustic attenuation structures.

The illustrative examples result in no distinct holes in the acoustic structure. The illustrative examples result in an aerodynamically smooth composite facesheet. This method to create a porous facing material for the acoustic structure would be aerodynamically smooth.

The illustrative examples may eliminate one of the three conventional curing steps in a typical conventional acoustic structure. In some illustrative examples, the gas permeable composite facesheet is cured and bonded to the cellular core in the same curing step. By reducing the number of curing steps, the illustrative examples may reduce overall manufacturing time.

The illustrative examples also improve acoustic characteristics. For example, the illustrative examples present an acoustic impedance that is less dependent on the intensity of the sound environment and the grazing flowfield compared to a conventional perforated facesheet. Thus, the illustrative examples provide better acoustic attenuation over a wide range of engine power settings.

To achieve the controlled amount of open porosity, a vacuum pressure differential will be created in the through thickness direction of the laminate ensuring air is always flowing through the facesheet during heating. The permeability/porosity of the gas permeable composite facesheet may additionally be changed by changing the resin content present in the partially impregnated composite material.

In one illustrative example, the through thickness pressure differential would be created using a hollow tool and regulated vacuum pressure on the bottom and top of the composite material. The permeability would be controlled by using inline mass flow/pressure sensors. These flow sensors allow for the direct measurement of gas permeability during the heating process.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
applying a first pressure to a first face of a composite material and a second pressure to a second face of the composite material to flow air through a thickness of the composite material, wherein the first pressure, the second pressure, and the composite material are within a pressure chamber; and
heating the composite material while flowing the air through the thickness of the composite material while within the pressure chamber to form a gas permeable composite facesheet.

2. The method of claim 1, wherein flowing air through the thickness of the composite material comprises flowing air through a partially impregnated composite material.

3. The method of claim 2, wherein flowing air through the partially impregnated composite material comprises flowing air through a partially impregnated composite material having an impregnation level in a range of seventy five percent to ninety five percent and a resin content between twenty weight percent and forty weight percent.

4. The method of claim 1, wherein flowing air through the thickness of the composite material creates a designated porosity in the gas permeable composite facesheet, wherein the designated porosity causes a permeability of the gas permeable composite facesheet.

5. The method of claim 1, wherein heating the composite material while flowing air through the thickness of the composite material to form the gas permeable composite facesheet creates the gas permeable composite facesheet comprising a carbon fiber fabric.

6. The method of claim 1, wherein applying the first pressure to the first face of the composite material and the second pressure to the second face of the composite material applies a through thickness pressure differential to the composite material to cause the air flow.

7. The method of claim 6, further comprising:
applying the second pressure of the through thickness pressure differential to a cellular core contacting the second face of the composite material.

8. The method of claim 7, wherein applying the second pressure of the pressure differential to the cellular core contacting the second face of the composite material comprises applying the second pressure of the pressure differential to the cellular core having a permeability greater than the permeability of the gas permeable composite facesheet.

9. The method of claim 6, further comprising:
monitoring the through thickness pressure differential during the heating;
monitoring a mass flow rate during the heating; and
changing the through thickness pressure differential to modify the permeability of the gas permeable composite facesheet.

10. The method of claim 6, wherein applying the through thickness pressure differential to the composite material comprises:
supplying the first pressure to the first face of the composite material through a permeable tool face.

11. The method of claim 10, wherein the first pressure is greater than the second pressure.

12. The method of claim 6, wherein applying the through thickness pressure differential to the composite material comprises:
supplying the first pressure to the first face of the composite material through flow media contacting the first face of the composite material.

13. The method of claim 12, wherein the first pressure is greater than the second pressure.

14. The method of claim 6, wherein the permeability is affected by the through thickness pressure differential according to Darcie's Law, $$Q = -\frac{kA(p_b - p_a)}{\mu L},$$

wherein "Q" is mass flow rate, "k" is the permeability, "A" is surface area of the composite material, $(p_b - p_a)$ is the through thickness pressure differential, $\mu$ is viscosity of air going through the composite material, and "L" is the thickness of the composite material.

15. The method of claim 1, further comprising:
monitoring a mass flow rate during the heating; and
changing an amount of air flowing through the thickness of the composite material to modify the permeability of the gas permeable composite facesheet.

16. The method of claim 1, wherein heating the composite material while flowing air through the thickness of the composite material to form the gas permeable composite facesheet creates the gas permeable composite facesheet with an aerodynamic drag less than a composite facesheet with perforations having a same permeability as the gas permeable composite facesheet.

17. A method comprising:
applying a first pressure to a first face of a composite material and a second pressure to a cellular core in contact with a second face of the composite material to flow air through a thickness of the composite material and the cellular core in contact with the second face of the composite material, wherein the first pressure, the second pressure, the composite material, and the cellular core are within a pressure chamber; and
heating the composite material while flowing air through the thickness of the composite material while within the pressure chamber to form a gas permeable composite facesheet joined to the cellular core.

18. The method of claim 17 further comprising:
changing a rate of air flow through the thickness of the composite material to change a permeability of the gas permeable composite facesheet.

19. The method of claim 18, further comprising:
monitoring a through thickness pressure differential during the heating; and
monitoring a mass flow rate during the heating, wherein changing the rate of air flow through the thickness of the composite material is done based on at least one of the through thickness pressure differential or the mass flow rate.

20. The method of claim 17, wherein applying the first pressure to the first face of the composite material and the second pressure to the cellular core in contact with the second face of the composite material applies a through thickness pressure differential to the composite material to cause the air flow.

21. The method of claim 20, wherein applying the through thickness pressure differential to the composite material comprises:
supplying the first pressure to the first face of the composite material through a permeable tool face.

22. The method of claim 21, wherein the first pressure is greater than the second pressure.

23. The method of claim 20, wherein applying the through thickness pressure differential to the composite material comprises:
supplying the first pressure to the first face of the composite material through flow media contacting the first face of the composite material.

24. The method of claim 23, wherein the first pressure is greater than the second pressure.

25. The method of claim 1, wherein applying the first pressure to the first face of the composite material and the second pressure to the second face of the composite material applies a through thickness pressure differential to the composite material to cause the air flow while within an oven or autoclave.

* * * * *